(12) United States Patent
Ganesan et al.

(10) Patent No.: US 12,328,379 B2
(45) Date of Patent: Jun. 10, 2025

(54) METHODS AND APPARATUS TO SYNCHRONIZE SIGNALS IN ENERGY EFFICIENT ETHERNET PROTOCOLS

(71) Applicant: Texas Instruments Incorporated, Dallas, TX (US)

(72) Inventors: Raghu Ganesan, Bangalore (IN); Saravanakkumar Radhakrishnan, Aruppukottai (IN)

(73) Assignee: Texas Instruments Incorporated, Dallas, TX (US)

( * ) Notice: Subject to any disclaimer, the term of this patent is extended or adjusted under 35 U.S.C. 154(b) by 177 days.

(21) Appl. No.: 17/729,654

(22) Filed: Apr. 26, 2022

(65) Prior Publication Data

US 2023/0136070 A1    May 4, 2023

(51) Int. Cl.
*H04L 7/00*      (2006.01)
(52) U.S. Cl.
CPC .................................. *H04L 7/0016* (2013.01)
(58) Field of Classification Search
CPC ................. H04L 7/0025; H04L 7/0016; H04L 2025/03477; H04L 7/0029; H04L 2027/0069; H04L 25/03267; H04L 7/0062
USPC .................................................. 375/354, 376
See application file for complete search history.

(56) References Cited

U.S. PATENT DOCUMENTS

| | | | |
|---|---|---|---|
| 11,943,083 B1* | 3/2024 | Dai | H04L 25/497 |
| 2008/0075151 A1* | 3/2008 | Fujiwara | G01S 5/0218 375/152 |
| 2021/0288836 A1* | 9/2021 | Ganesan | H04L 12/40039 |
| 2024/0063996 A1* | 2/2024 | Hocker | H04L 7/0004 |
| 2024/0106688 A1* | 3/2024 | Radhakrishnan | H04L 7/0062 |

* cited by examiner

Primary Examiner — Khai Tran
(74) Attorney, Agent, or Firm — Valerie M. Davis; Frank D. Cimino

(57) ABSTRACT

Methods, apparatus, and systems to synchronize Ethernet signals are disclosed. An example apparatus includes slicer circuitry having an input coupled to interface circuitry and having an output, the slicer circuitry configured to receive an analog signal corresponding to a first Analog to Digital Converter (ADC) clock in a plurality of ADC clocks and operable to determine symbols based on the analog signal; logic circuitry to determine whether there is a symbol transition in the symbols; timing error detector circuitry to update an error value in response to the determination that there is a symbol transition; timing loop circuitry to determine a frequency of voltage oscillations based on at least the error value; and phase interpolator circuitry to change a plurality of phase parameters corresponding to the plurality of ADC clocks at a rate given by the frequency of voltage oscillations.

20 Claims, 16 Drawing Sheets

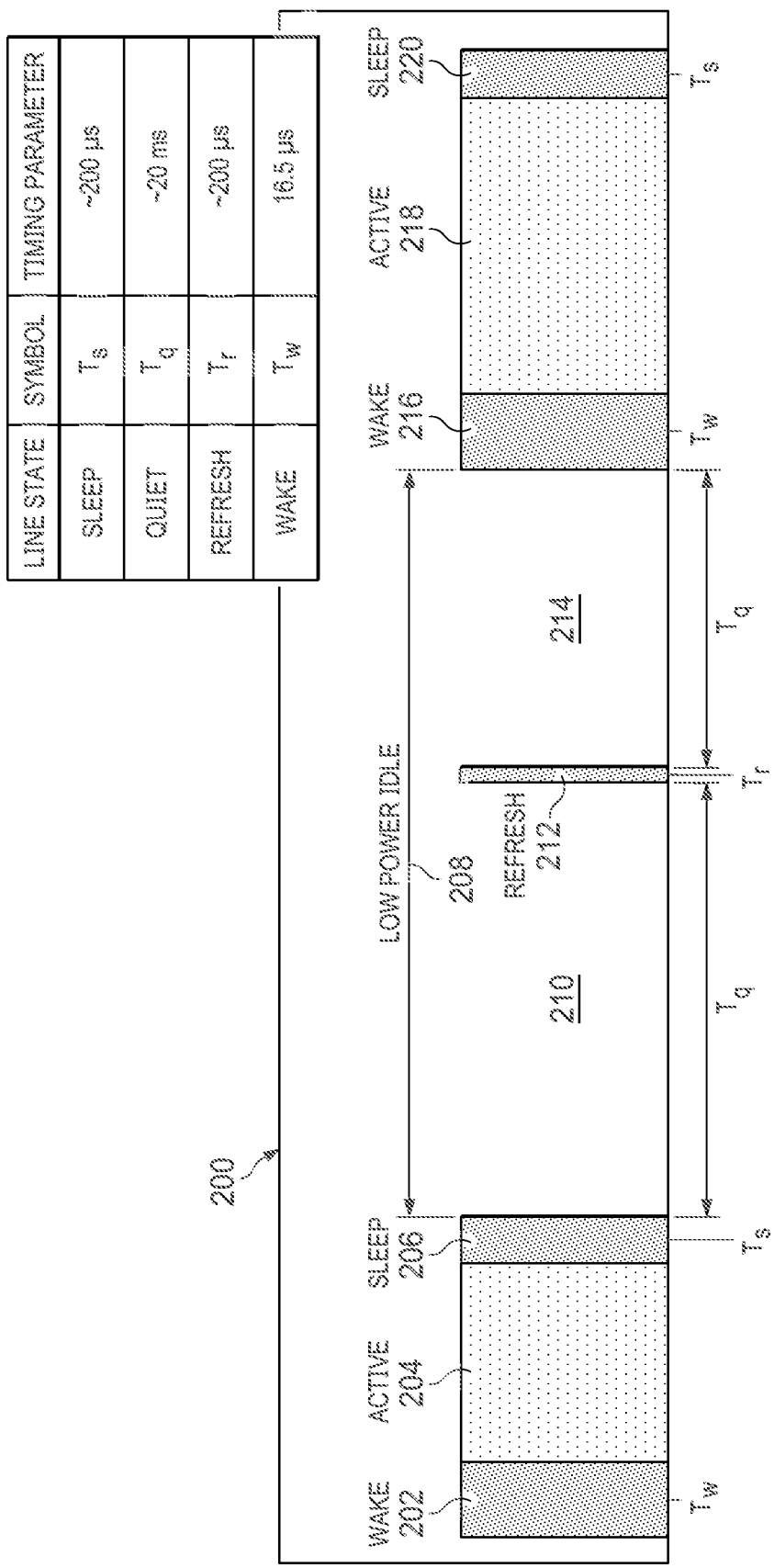

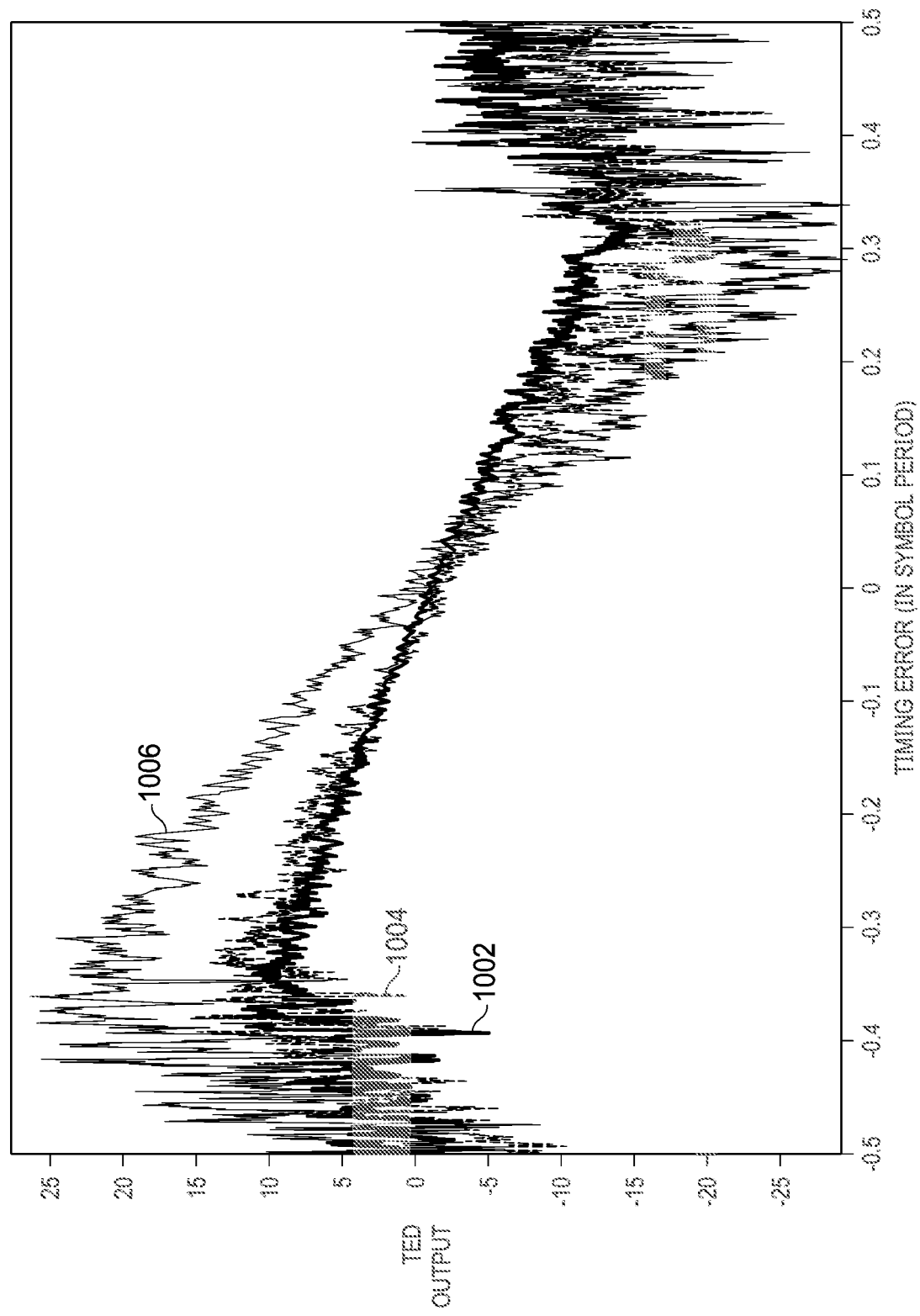

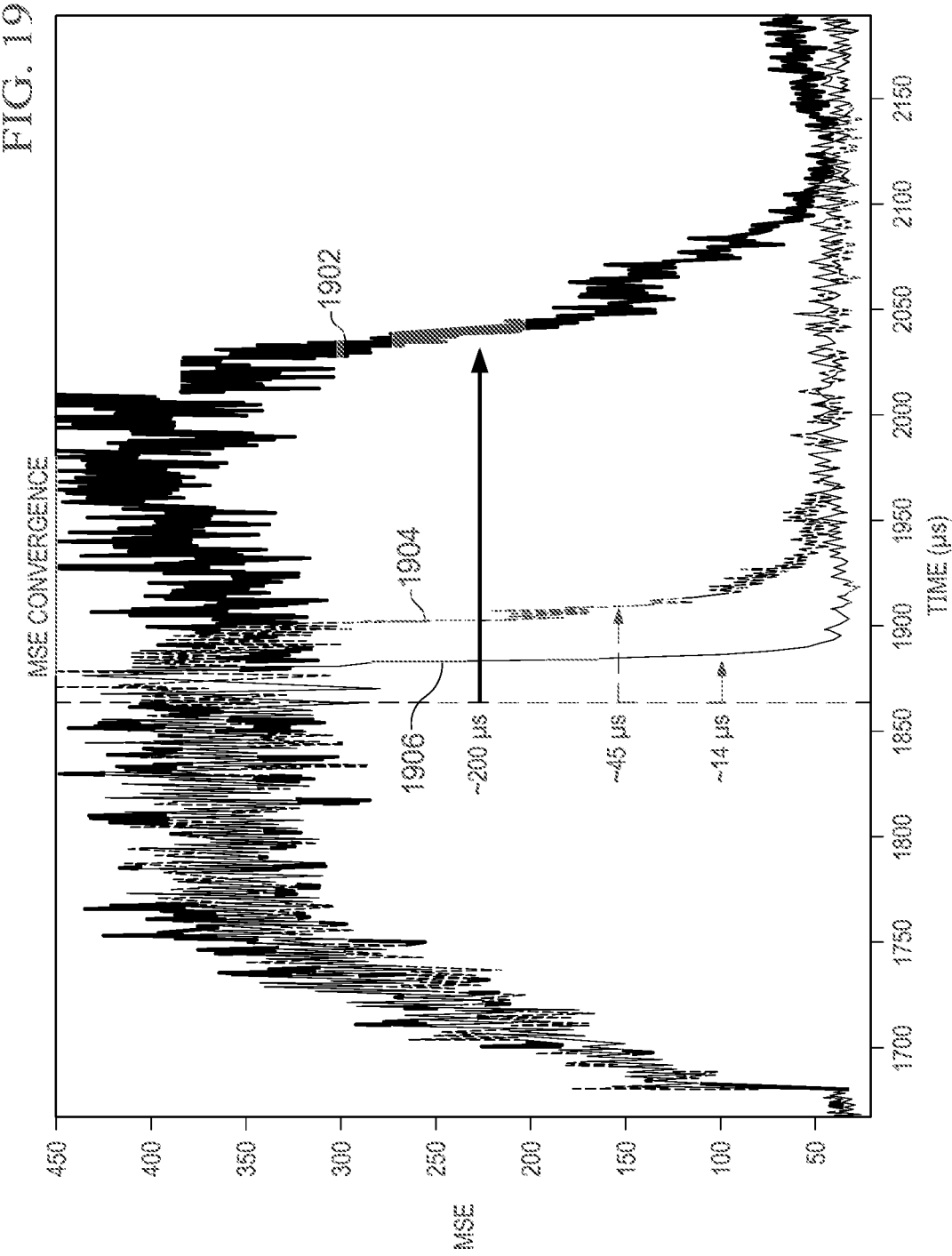

METHODS AND APPARATUS TO SYNCHRONIZE SIGNALS IN ENERGY EFFICIENT ETHERNET PROTOCOLS

RELATED APPLICATION

This patent application claims the benefit of and priority from Indian Patent Application Number 202141049433, which was filed on Oct. 28, 2021, and is hereby incorporated by reference in its entirety.

FIELD OF THE DISCLOSURE

This disclosure relates generally to Ethernet protocols and, more particularly, to methods and apparatus to synchronize signals in energy efficient Ethernet protocols.

BACKGROUND

An increase in the number of computing devices has lead manufacturers and industry representatives to develop standards that facilitate how devices can reliably and efficiently communicate with one another other. One example communication standard is Ethernet, which is defined by the Institute of Electrical and Electronic Engineers (IEEE). The Ethernet standard enables two or more devices to send and receive data over one or more wired connections.

SUMMARY

Methods, apparatus, and systems to synchronize Ethernet signals are disclosed. An example apparatus includes slicer circuitry having an input coupled to interface circuitry and having an output, the slicer circuitry configured to receive an analog signal corresponding to a first Analog to Digital Converter (ADC) clock in a plurality of ADC clocks and operable to determine symbols based on the analog signal; logic circuitry to determine whether there is a symbol transition in the symbols; timing error detector circuitry to update an error value in response to the determination that there is a symbol transition; timing loop circuitry to determine a frequency of voltage oscillations based on at least the error value; and phase interpolator circuitry to change a plurality of phase parameters corresponding to the plurality of ADC clocks at a rate given by the frequency of voltage oscillations.

BRIEF DESCRIPTION OF THE DRAWINGS

FIG. 2 is an example timing diagram showing various states of the Energy Efficient Ethernet (EEE) protocol.

FIG. 10 is a graph of an illustrative example of an S-curve to characterize the first TED circuitry and second TED circuitry of FIG. 5.

FIG. 19 is a graph that describes the performance of the second solution to synchronize signals in Ethernet protocols.

In general, the same reference numbers or other reference designators are used throughout the drawing(s) and accompanying written description to refer to the same or similar (functionally and/or structurally) features. The figures are not to scale.

DETAILED DESCRIPTION

Figure 1:
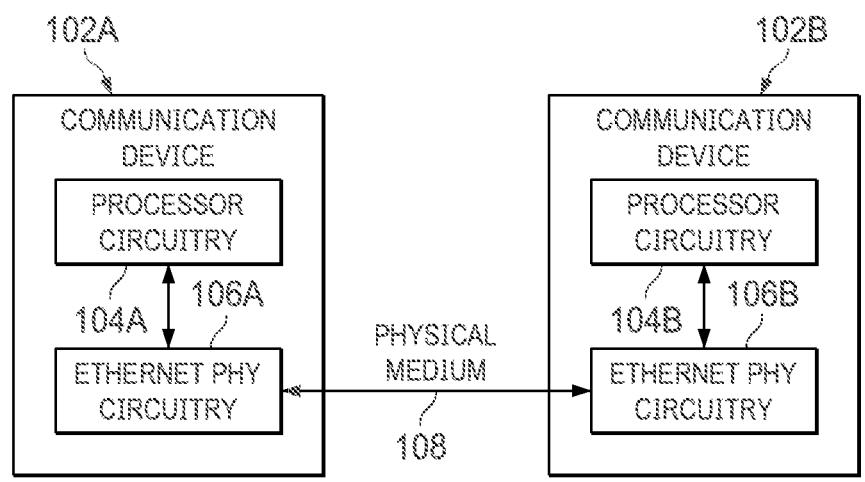
FIG. 1 is a block diagram of an illustrative example of communication between two devices.

FIG. 1 is an illustrative example of communication between two devices, e.g., communication devices 102A and 102B. An example communication device 102A includes example processor circuitry 104A and example ethernet PHY circuitry 106A, and example communication device 102B includes example processor circuitry 104B and example ethernet PHY circuitry 106B.

The example communication devices 102A-102B of FIG. 1 are devices that can communicate using the Energy Efficient Ethernet (EEE) standard. In 2010, IEEE 8023.AZ introduced the EEE standard for decreased power consumption of Ethernet supporting physical layer devices (e.g., it describes communication protocols for Ethernet physical (PHY) circuitry such as PHY 106A-106B). This standard and subsequent versions thereof are hereby incorporated by reference in their entirety. The example communication devices 102A-102B may include additional components and functionality not illustrated in FIG. 1. For example, the example communication devices 102A may be implemented by the processor platform 1500 of FIG. 15.

The example processor circuitry 104A executes instructions for the example communication device 102A. In the illustrative example of FIG. 1, the instructions cause the example processor circuitry 104A to send data to the processor circuitry 104B. Similarly, the example processor circuitry 104B executes instructions to receive the data sent by the processor circuitry 104A. In some examples, the example processor circuitry 104B may execute instructions to perform an action based on the data. In some examples, the example processor circuitry instances 104A-104B may be referred to as Media Access Controllers (MAC)s. Processor circuitry 104A and/or 104B may include digital circuitry (e.g., logic circuitry), analog circuitry (e.g., amplifiers, filters, transistors, etc.), converters (e.g., voltage converter, voltage regulators, analog-to-digital converters and/or digital-to-analog converters), memory, processor, state machine, microcontroller, microcomputer and/or software.

The example Ethernet PHY circuitry 106A accesses data identified by the processor circuitry 104A. The example Ethernet PHY circuitry 106A connects to a physical medium 108. In some examples, the physical medium is a wired connection such as an Unshielded, Twisted Pair cable that is connected to the Ethernet PHY circuitry instances 106A-106B via an RJ45 port. However, in other examples, medium 108 can be implemented using any type of wired or wireless transmission medium. In some examples, the example Ethernet PHY circuitry 106A transmits data and/or instructions over the physical medium 108 to the example Ethernet PHY circuitry 106B using the EEE standard. In other examples, the communications via medium 108 can be in either direction and/or in both directions. PHY circuitry 106A and/or 106B 102 may include digital circuitry (e.g., logic circuitry), analog circuitry (e.g., amplifiers, filters, transistors, etc.), converters (e.g., voltage converter, voltage regulators, analog-to-digital converters and/or digital-to-analog converters), memory, processor, state machine, microcontroller, microcomputer and/or software. In some examples, PHY circuitry 106A and/or 106B may be incorporated into processor circuitry 104A and/or 104B, respectively.

The illustrative example of FIG. 1 shows how two devices may communicate using Ethernet protocols. By using EEE, the example communication devices 102A-102B are able to transmit and receive data with less power consumption than other Ethernet protocols. In other examples, additional communication devices 102 may be coupled to medium 108.

FIG. 2 is an illustrative example of the Energy Efficient Ethernet (EEE) protocol. The example timing 200 of FIG. 2 shows the power state of a receiving channel on an Ethernet PHY circuit over time. FIG. 2 includes an example timing 200, a first wake state 202, a first active state 204, a first sleep state 206, a Low Power Idle (LPI) interval 208, a first quiet state 210, a refresh state 212, a second quiet state 214, a second wake state 216, a second active state 218, and a second sleep state 220.

The wake states 202, 216 represent amounts of time when an Ethernet PHY circuit prepares to send and receive new data packets. After exiting the first wake state 202, the receiving channel enters the first active state 204, where it receives data using full power. If an amount of time passes in the active state 204 without receipt of data, the Ethernet PHY circuit may enter the first sleep state 206 and eventually transition into the LPI interval 208. The EEE standard improves upon other Ethernet standards by introducing the LPI interval 208. During the LPI interval 208, data packets are not being sent or received. As a result, the transmitting and receiving channels of an Ethernet PHY circuit can be turned off, reducing power consumption. The LPI interval 208 is visualized in the example timing 200 as a summation of the first quiet state 210, the refresh state 212, and the second quiet state 214.

The refresh state 212 of FIG. 2 represents an amount of time when a refresh signal is received by an Ethernet PHY circuit. During the LPI interval 208, the Ethernet PHY circuits may send and receive the refresh signal on a periodic basis. In some examples, the refresh state 212 extends for 200 microseconds (200 µs). In other examples, the refresh state 212 may extend for a different amount of time. The Ethernet PHY circuits may periodically enter the refresh state 212 to send and receive the refresh signal, which maintains signal integrity. The time period during the LPI interval 208 excluding the refresh state 212 may be referred to as the first quiet state 210 or the second quiet state 214.

The sleep state 206 of FIG. 2 represents an amount of time when an Ethernet PHY circuit powers off its timing loop circuitry, which is part of the receiver channel that is used to correctly interpret data. In some examples, the sleep state 206 extends for 200 µs. In other examples, a the sleep state 206 extends for a different amount of time. An Ethernet PHY circuit may enter the sleep state 206 upon determining that data packets have not been sent or received for a threshold amount of time defined by the EEE standard.

The second wake state 216 of FIG. 2 marks the end of the LPI interval 208. For 1000BASE-T, an IEEE standard for Gigabit transmission using Ethernet (which is hereby incorporated by reference in its entirety), the EEE standard was updated so that a wake state can only extend for 16.5 µs. An Ethernet PHY circuit may enter either of wake states 202, 216 upon a determination that new data packets have been transmitted or will be transmitted for the Ethernet PHY circuit to receive.

The 16.5 µs wake state defined by EEE for 1000BASE-T can be further divided into three phases. In the first phase, an Ethernet PHY circuit detects a wake energy pulse and turns on Receive and Transmit Analog Front End (AFE) circuitry. AFE circuitry refers to a set of signal conditioning circuitry that interfaces with the physical medium. In some examples, the first phase takes 5 µs. In the second phase, an Ethernet PHY circuit retrains timing loop circuitry, which is discussed further in FIGS. 3A and 3B. In some examples, the second phase may be referred to as synchronization and may last 6 µs. In the third phase, an Ethernet PHY circuit retrains echo cancellers and equalizers, which are used to cancel a signal from local transmitter AFE circuitry that can be reflected onto local receiver AFE circuitry. In some examples, the third phase takes 5.5 µs. After the completion of the second wake state 216, the receiving channel enters a second active state 218 and may enter a second sleep state 220 after an amount of time.

Other solutions to implement an Ethernet PHY circuit under EEE fail to achieve a wake state under 16.5 µs required for 1000BASE-T transmission. One challenge in fully preparing an Ethernet PHY circuit to transmit and receive data packets is the retraining of timing loop circuitry in under 6 µs. The synchronization phase of some examples is discussed further with reference to FIGS. 3A and 3B. Other solutions are described further with reference to FIGS. 16-19.

Example systems, methods, and apparatus disclosed herein complete the synchronization phase in under 6 µs and meet the 16.5 µs wake state requirement for EEE and 1000BASE-T. Example Ethernet PHY receiver circuitry includes first Timing Error Detector (TED) circuitry to update symbol error values in response to a determination that a symbol transition occurs. Example primary timing loop circuitry also applies second TED circuitry when at least two consecutive symbol decisions occur within the same window of time for a given pulse. Example MSE calculator circuitry calculates the Mean Square Error (MSE) of the example slicer circuitry output. The example primary timing loop circuitry uses the Mean Square Error to determine when to sweep an ADC sampling clock. Example secondary timing loop circuitry receives a frequency output signal from the primary timing loop circuitry and uses it so that a plurality of ADC sampling clocks are swept concurrently. In doing so, the example Ethernet PHY receiver circuitry reduces phase error in ADC sampling clocks, reduces lock time from intersymbol interference, and completes the synchronization phase under 6 μs.

Figure 3A:
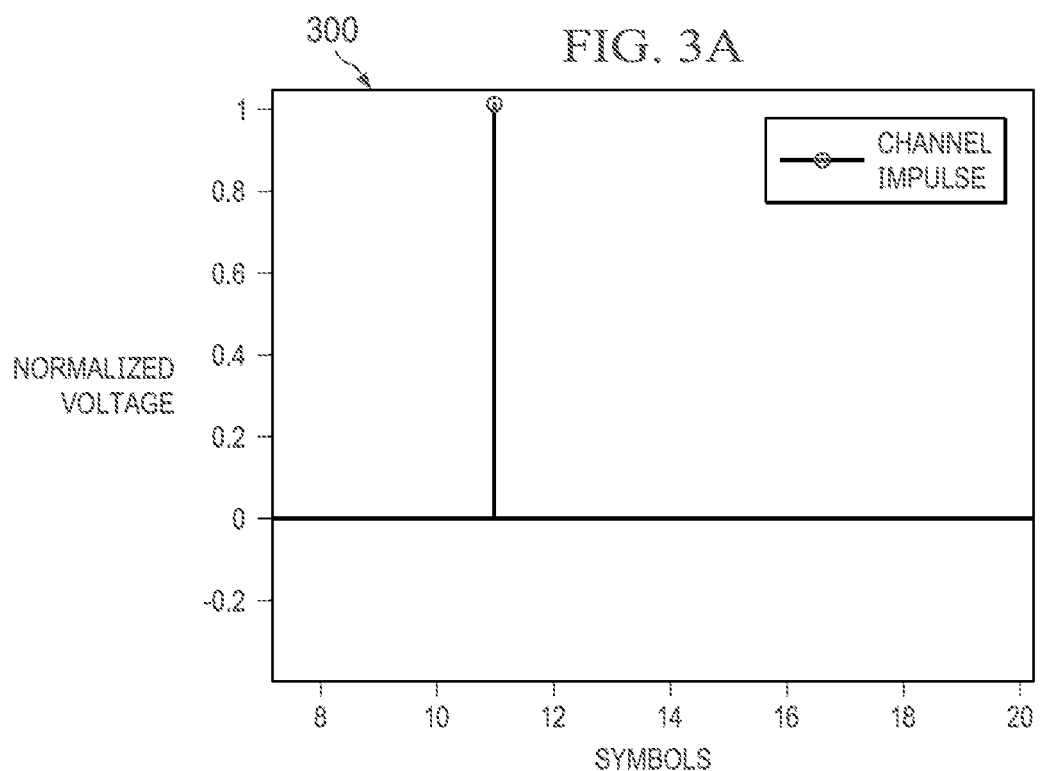
FIGS. 3A and 3B are graphs of an illustrative example of pre-cursor and post-cursor voltages that are received over the physical medium of FIG. 1.
Figure 3B:
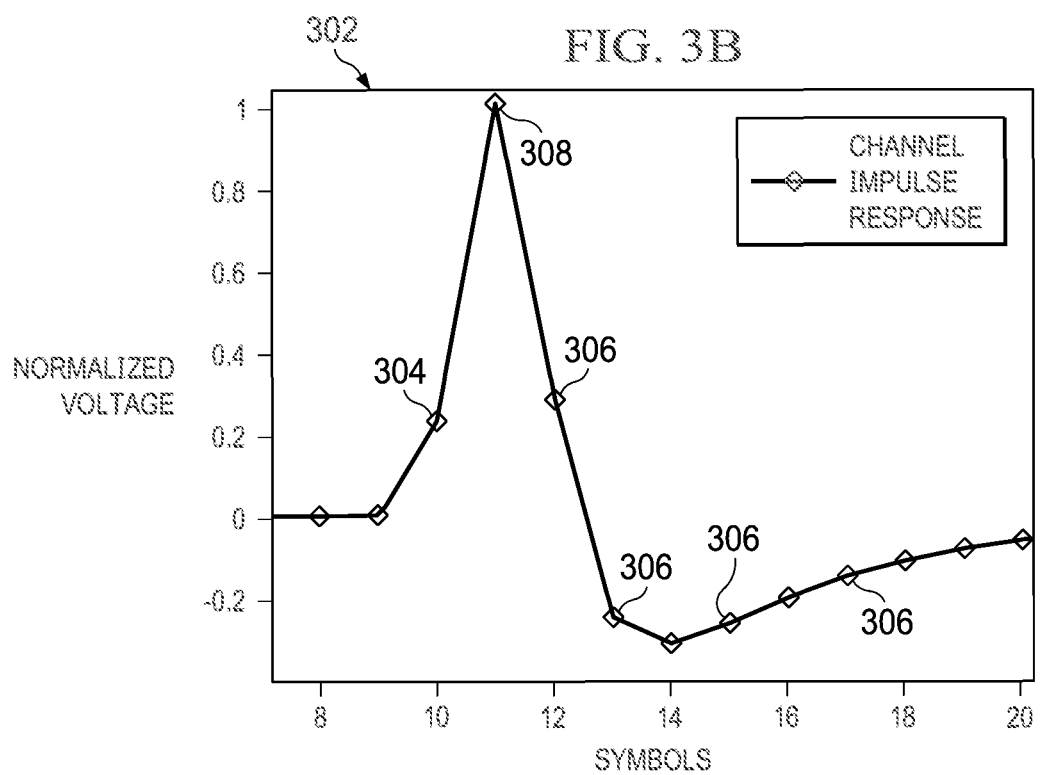

FIGS. 3A and 3B are an illustrative example of pre-cursor and post-cursor voltages. FIG. 3A includes a channel impulse 300 and FIG. 3B includes a channel impulse response 302. The channel impulse response 302 includes pre-cursor voltages 304, post-cursor voltages 306, and a peak voltage 308.

A digital bit may be implemented in the analog domain as a high voltage for a digital '1', or a low voltage for a digital '0', for a pre-determined amount of time. In some examples, a digital bit may be referred to as a symbol. In some examples, a receiver may be designed to consider any voltage within a first pre-determined range to be a high voltage and interpret said voltage as a digital '1'. Similarly, the receiver may be designed to consider any voltage within a second pre-determined range to be a low voltage and interpret said voltage as a digital '0'. In some examples, a range of voltages may be determined based off a desired voltage and an accepted error threshold. To send multiple digital bits as a signal, the analog voltages that implement the bits may be transmitted as a square wave so that the transmitted voltages change from high to low or vice versa as soon as the value of the digital bit changes. In some examples, the time it takes for a single digital bit to be represented in a square wave is referred to as a pulse.

When analog voltages are transmitted over a physical medium, imperfections in the physical medium can cause the pulse to spread in time. For example, in FIG. 3A, the channel impulse 300 illustrates an output signal before its transmission over a physical medium, and in FIG. 3B, the channel impulse response 302 shows the output signal after its transmission over the physical medium. The x axis of FIG. 3A represents the time at which a given indexed symbol (i.e., indexed bit) is transmitted over the physical medium. For example, the eighth symbol is transmitted before the ninth symbol, which is transmitted before the tenth symbol, etc. Similarly, the x axis of FIG. 3B represents the time at which a given indexed symbol is received after transmission over the physical medium. For example, the eighth symbol is received before the ninth symbol, which is received before the tenth symbol, etc. They axes of both FIGS. 3A and 3B represent the normalized voltage of the respective signal. The y axis voltages are normalized so that the high voltage used to implement a digital '1' appears as 1 on both axes, regardless of the analog value of the high voltage. Similarly, the y axis voltages are normalized so that the low voltage used to implement a digital '0' appears as 0 on both the y axes, regardless of the analog value of the low voltage.

In the channel impulse 300, the analog voltage goes high only during the fourth symbol (i.e., the symbol with index 11) of the thirteen that are shown for an arbitrary amount of time. That is, symbols 8-20 in the channel impulse 300 may be represented as the following digital bits: [0001000000000]. After the output signal is transmitted over a physical medium 108 and received by a device such as an Ethernet PHY circuit, the high pulse on symbol 11 has spread over time. This results in pre-cursor voltages 304 before the peak voltage 308 and post-cursor voltages 306 after the peak voltage 308 in FIG. 3B that are received over the physical medium but are not representative of the transmitted digital bit. If the transmitted output signal included other pulses with high voltages, their transmission over the physical medium 108 would result in additional pre-cursor voltages 304 and post-cursor voltages 306.

Intersymbol Interference (ISI) refers to the phenomenon where pre-cursor voltages 304 and post-cursor voltages 306 from different symbols overlap in time. The misrepresented voltages that occur during ISI can constructively or destructively sum to become a new voltage, which may result in the Ethernet PHY circuitry incorrectly assigning a digital bit value to the new voltage. In some examples, assigning a digital bit value to an analog voltage may be referred to as a symbol decision.

To overcome ISI and make symbol decisions that accurately represent the transmitted signals, Analog to Digital Converter (ADC) circuitry within the receiver attempt to sample the received signal at precise intervals that align with the peak voltage 308 of a given symbol. If the sampled voltage of an example symbol is accurate, a receiver can then use the sampled voltage to calculate the pre-cursor voltages 304 and post-cursor voltages 306 caused by the transmission of the example symbol over time and remove these values from the analog voltages of adjacent symbols through addition or subtraction. In some examples, the change in an analog voltage caused by the removal of pre-cursor or post-cursor voltages can cause the symbol decision to change (i.e., a digital '0' to be corrected to a digital '1' or vice versa). The changing of a symbol decision to remove ISI may be referred to as symbol correction.

Symbol correction from ISI relies upon accurate sampling by ADC circuitry. ADC circuitry therefore relies upon a signal from clock circuity to determine when to sample the received analog voltage. Clock circuits can be characterized by their phase and frequency, which naturally drift over time due to imperfections in the crystal oscillators (or other type of clock generating devices, such as bulk acoustic wave (BAW) devices) included in clock circuits. When timing loop circuitry is powered on, it can identify and correct the phase and frequency drifts of the clock circuit. In some examples, correction of the phase and frequency drifts of a clock to correct symbol decisions is referred to as symbol timing recovery. When timing loop circuitry is powered off during the LPI interval 208, phase and frequency drift continues in the clock circuit but remain unidentified by timing loop circuitry. As such, for 1000BASE-T transmissions with EEE, a 6 μs synchronization phase exists within the wake states 202, 216 for timing loop circuitry to perform symbol timing recovery. In some examples, such correction may be referred to as locking onto correct clock parameters. In some such examples, the time it takes to complete the synchronization phase may also be referred to as a lock time.

Figure 4:
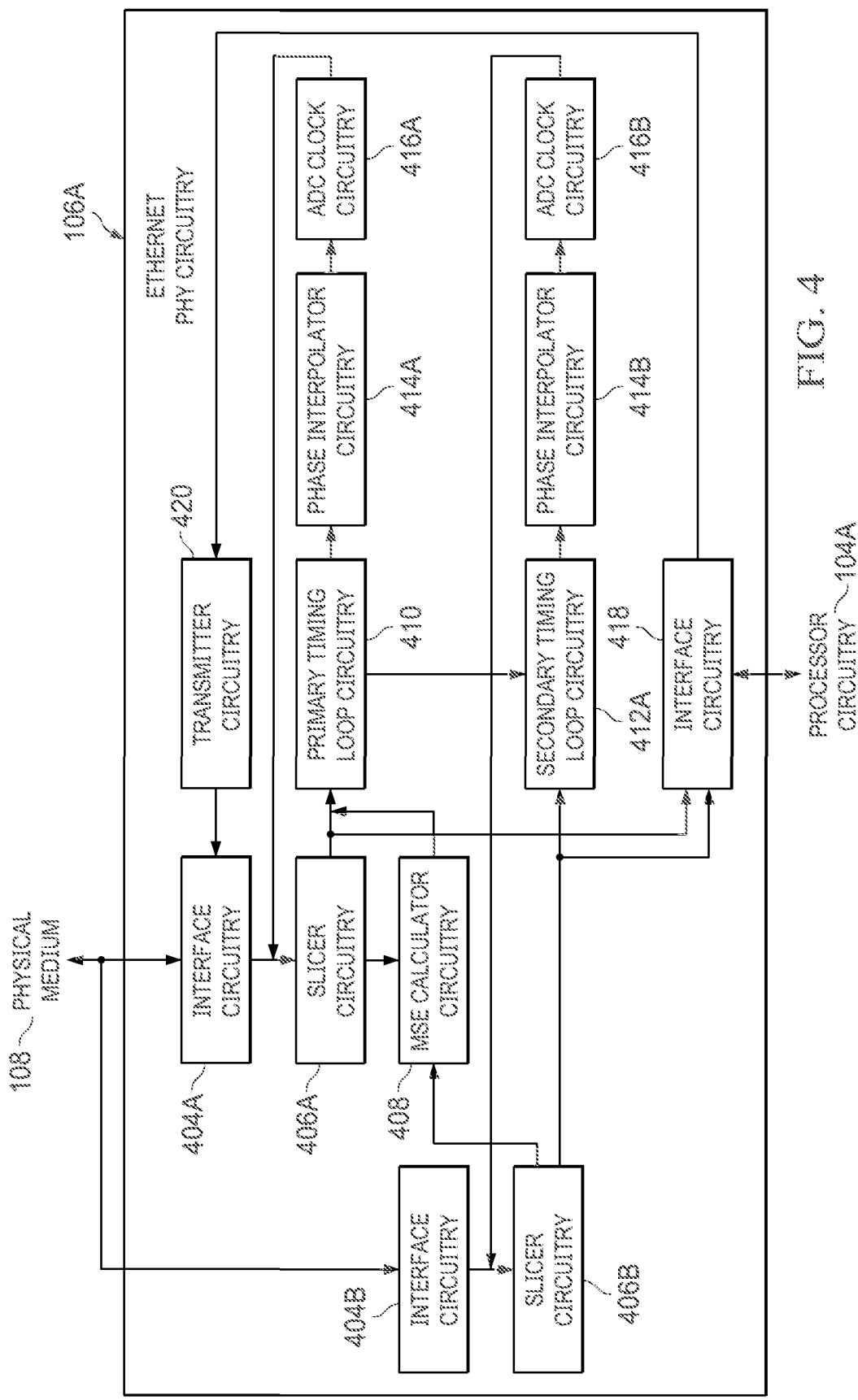
FIG. 4 is a block diagram of the example Ethernet PHY circuitry of FIG. 1.

FIG. 4 is a block diagram of the example Ethernet PHY circuitry 106A of FIG. 1. Ethernet PHY circuitry 106B may also be implemented using the block diagram of FIG. 4 (where interface circuitry 418 would be coupled to processor circuitry 104B instead of 104A). The example Ethernet PHY circuitry 106A includes receiver circuitry to complete the synchronization phase of the wake states 202, 216 defined by EEE for 200BASE-T transmission under 6 μs. The Ethernet PHY circuitry 106A of FIG. 4 may be instantiated (e.g., creating an instance of, bring into being for any length of time, materialize, implement, etc.) by processor circuitry such as an Ethernet PHY circuit. The example Ethernet PHY circuitry 106A illustrated in FIG. 4 may be implemented by devices that include but are not limited to the Texas Instruments® DP83871 and DP83TG721 chips.

It should be understood that some or all of the functions of FIG. 4 may, thus, be instantiated at the same or different times. Some or all of the functions may be instantiated, for example, in one or more threads executing concurrently on hardware and/or in series on hardware. The Ethernet PHY circuitry 106A includes example interface circuitry 404A, 404B, example slicer circuitry 406A, 406B, example MSE calculator circuitry 408, example primary timing loop circuitry 410, secondary timing loop circuitry 412A, example phase interpolator circuitry 414A, 414B, example ADC clock circuitry 416A, 416B, example interface circuitry 418, and example transmitter circuitry 420. In some examples, the example interface circuitry 404A, 404B, example slicer circuitry 406A, 406B, example MSE calculator circuitry 408, example primary timing loop circuitry 410, secondary timing loop circuitry 412A, example phase interpolator circuitry 414A, 414B, example ADC clock circuitry 416A, 416B may be referred to as receiver circuitry.

The example interface circuitry 404A of FIG. 4 receives a first analog signal from a physical medium. In some examples, the physical medium is an unshielded, twisted pair cable that is connected to the Ethernet PHY circuit via an RJ45 port. In other examples, the interface circuitry 404A connects to a different physical medium. Similarly, the interface circuitry 404B receives second analog signals from the physical medium. The example interface circuitry 404A and example interface circuitry 404B are part of two communication lanes implemented in the example Ethernet PHY circuitry 106A. The two communication lanes support greater bandwidth by receiving the first analog signal and second analog signal concurrently. While not illustrated in FIG. 4, the example Ethernet PHY circuitry 106A may implement more than two communication lanes. For example, Ethernet PHY circuitry 106A operating with the 1000 BASE-T standard requires four communication lanes to support a Gigabit per second bandwidth.

The example slicer circuitry 406A of FIG. 4 accesses the first analog signal from the example interface circuitry 404A and receives a clock signal from the ADC clock circuitry 416A. At intervals determined by the ADC clock circuitry 416A, the example slicer circuitry 406A samples the analog signal and makes symbol decisions. If a sampled voltage exceeds a threshold, the example slicer circuitry 406A generates a high voltage for an output to mark the symbol as a digital '1' (e.g., a digital "high" or a logic "high"). In some examples, the high voltage may be any voltage between +2.0 V or +3.63 V. If a sampled voltage does not exceed the threshold, the example slicer circuitry 406A generates a low voltage for an output to mark the symbol as a digital '0' (e.g., a digital "low" or a logic "low"). In some examples, the low voltage is zero volts.

Like the example slicer circuitry 406A, the example slicer circuitry 406B makes symbol decisions of the second analog signal which it receives from the interface circuitry 404B. The example slicer circuitry 406B samples the second analog signal at intervals determined by the ADC clock circuitry 416B. The example slicer circuitry 406A and example slicer circuitry 406B are part of the two communication lanes shown in FIG. 4. In some examples, each communication lane implemented in the Ethernet PHY circuitry 106A uses the same threshold voltage for comparison and high voltage for output. For example, if the high voltage has a maximum accepted value of +3.63 V, the Ethernet PHY circuitry 106A may use +2.0 V as a threshold voltage and interpret any received voltage over +2.0 V as a digital '1' bit. The slicer circuitry 406A is explored further in FIG. 6.

The example MSE calculator circuitry 408 of FIG. 4 calculates a short term MSE signal based on the input and output voltages each slicer circuitry instance 406A-406B. The short term MSE signal represents an amount of error that exists in the symbol decisions made by the slicer circuitry instances 406A-406B. The example MSE calculator circuitry 408 is discussed further with reference to FIG. 8.

The example primary timing loop circuitry 410 of FIG. 4 generates a phase adjustment signal for the ADC clock circuitry 416A. The example primary timing loop circuitry 410 also generates a phase sweep signal for the example secondary timing loop circuitry 412A, and for any other secondary timing loop circuitry instances 412B, 412C that are implemented in additional communication lanes. The primary timing loop circuitry 410 uses the symbol decisions from the slicer circuitry 406A and the MSE value from the MSE calculator circuitry 408 to generate the phase adjustment signal and the phase sweep signal. The primary timing loop circuitry 410 is discussed further with reference to FIG. 5.

The example secondary timing loop circuitry 412A of FIG. 4 generates a phase adjustment signal for the ADC clock circuitry 416B. The secondary timing loop circuitry 412A uses the symbol decisions from the slicer circuitry 406B and the phase sweep signal from the primary timing loop circuitry 410 to generate the phase adjustment signal. The example secondary timing loop circuitry instances 412A, 412B, 412C are discussed further with reference to FIG. 9.

The phase interpolator circuitry 414A receives the phase adjustment signal from the primary timing loop circuitry 410. The phase interpolator circuitry 414A then makes adjustment to the clock parameters within the ADC clock circuitry 416A. These adjustments alter when the ADC clock circuitry 416A provides a signal to the slicer circuitry 406A to make another symbol decision. Similarly, the phase interpolator circuitry 414B adjusts the ADC clock circuitry 416B that alter when the ADC clock circuitry 416B provides a signal to the slicer circuitry 406B to make another symbol decision.

The example interface circuitry 418 sends to and receives data from the example processor circuitry 104A. For example, the example interface circuitry 418 may provide symbol decisions from the slicer circuitry 406A, 406B to the processor circuitry 104A. In some examples, the processor circuitry 104A may perform an action based on the symbol decisions. In other examples, the processor circuitry 104A may additionally or alternatively provide data to the interface circuitry 418.

The example transmitter circuitry 420 of FIG. 4 provides analog signals to the interface circuitry 404A for transmission over the physical medium 108. The example transmitter circuitry 420 may determine analog signals for transmission based on data received from the processor circuitry 104A via the interface circuitry 418.

The example Ethernet PHY circuitry 106A performs symbol timing recovery by changing when the slicer circuitry 406A and slicer circuitry 406B make symbol decisions. Improved design within the primary timing loop circuitry 410 and the phase sweep signal allow the Ethernet PHY circuitry 106A to perform symbol timing recovery within the 16.5 µs wake state required for 1000 BASE-T connections on EEE, which other solutions to synchronize ethernet signals fail to meet.

Figure 5:
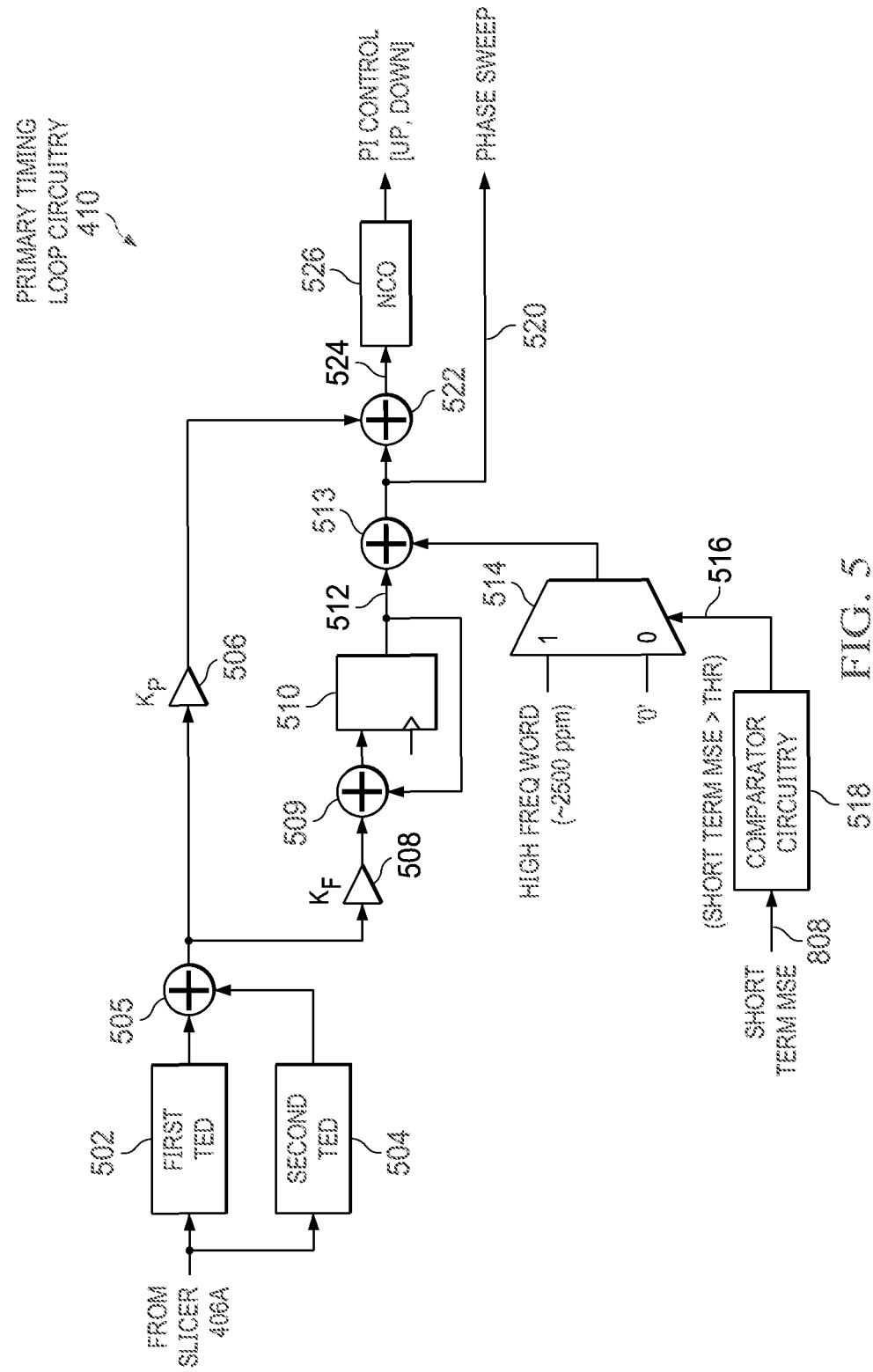
FIG. 5 is a block diagram of an example implementation of the primary timing loop circuitry of FIG. 4.

FIG. 5 is a block diagram of an example implementation of the primary timing loop circuitry 410 of FIG. 4. FIG. 5 includes an example first TED circuitry 502, an example second TED circuitry 504, an adder circuit 505, a first gain 506 (e.g., an amplifier or a buffer), a second gain 508 (e.g., an amplifier or a buffer), an adder circuit 509, a flip flop circuit 510 (e.g., a JK flip flop, a set/reset flip flop, Q flip flop or a T flip flop), a symbol delay signal 512, an adder circuit 513, example multiplexer circuitry 514, an example mux select signal 516, example comparator circuitry 518, a phase sweep signal 520, an adder circuit 522, a Numerically Controlled Oscillator (NCO) NCO input signal 524, and NCO circuitry 526.

The example first TED circuitry 502 of FIG. 5 receives a multiplexer select signal and symbol decisions from the slicer circuitry 406A. The example first TED circuitry 502 improves upon the MM-TED circuit 1602 (FIG. 16) by only generating error values proportionate to the symbol decisions when there is a symbol transition. The first TED circuitry 502 is discussed further with reference to FIG. 7.

The example second TED circuitry 504 receives symbol decisions from the slicer circuitry 406A and generates error values when at least two consecutive symbol decisions occur within the same window of time for a given pulse. Further, the example second TED circuitry 504 only generates error values when a first symbol decision was sampled using a pre-cursor voltage 304 and the next symbol decision was sampled using a post-cursor voltage 306. In some examples, the second TED circuitry 504 is referred to as an early-late TED because it uses a sample that is early relative to the optimal sampling time (e.g., when the peak voltage 308 occurs) and a sample that is late relative to the optimal sampling time. The adder circuit 505 adds the error values of the example first TED circuitry 502 an the second TED circuitry 504 form a TED output signal.

The first gain 506 and the second gain 508 receive the TED output signal. The flip flop circuit 510 outputs the symbol delay signal 512 based on the output of the adder circuit 509. The adder circuit 509 sums the outputs of gain 508 and the output of flip flop circuit 510. The symbol delay signal 512 is defined by $$\text{Symbol Delay}_{512} = K_j(n) + K_j(n-1) \quad (1)$$

where n represents a current symbol in the TED output signal and n−1 represents the previous symbol in the TED output signal.

The adder circuit 513 adds the symbol delay signal 512 to the output of the example multiplexer circuitry 514 to produce a phase sweep signal 520. The example multiplexer circuitry 514 determines whether the output signal should be a high frequency word (e.g., voltages representative of digital '1' and digital '0' bits transitioning at a high frequency) or a continuous digital '0' bit (e.g., a continuous low voltage).

The example multiplexer circuitry 514 generates an output signal based on the mux select signal 516. For example, when the mux select signal 516 is a high voltage representative of a digital '1', the example multiplexer circuitry 514 generates the high frequency word. By generating a high frequency word, the example multiplexer circuitry 514 enables the example NCO circuitry 526 to generate faster up or down pulses, which in turn increases the rate at which the example phase interpolator circuitry 414A alters parameters of the ADC clock circuitry 416A and changes the phase of the ADC clock. Altering parameters of the ADC circuitry may be referred to as a phase sweep, as the parameters change such that all possible phase values are cycled through and attempted until the phase error is not greater than a threshold value. In some examples, the number of up or down pulses in a given amount of time may be referred to as a frequency of voltage oscillations.

Alternatively, when the mux select signal 516 is a low voltage representative of a digital '0' bit, the phase sweep is no longer required and the multiplexer circuitry 514 generates a continuous digital '0' as the output signal. This digital '0' output signal slows the rate at which the phase interpolator circuitry 414A changes parameters, which allows the phase interpolator circuitry 414A to set specific or desired phase parameters for the ADC clock circuitry 416A to operate with.

The comparator circuitry 518 of FIG. 5 generates the mux select signal 516. The comparator circuitry may be implemented as one or more logic gates configured to receive the short term MSE signal 808 and compare it to a threshold value. The threshold value may be predetermined by a manufacturer and stored in a memory of the comparator circuitry 518. When the short term MSE signal 808 is greater than the threshold value, the comparator circuitry 518 outputs a high voltage representative of a digital '1' bit in the mux select signal 516. Similarly, when the short term MSE signal 808 is less than the threshold value, the comparator circuitry 518 outputs a low voltage representative of a digital '0' bit in the mux select signal 516. The short term MSE signal 808 is generated by the example MSE calculator circuitry 408 (FIG. 4) and is discussed further in reference to FIG. 8. In some examples, the Ethernet PHY circuitry 106A may be referred to as being in an LPI acquire state when the short term MSE signal 808 is greater than the threshold value.

The first gain 506 of FIG. 5 amplifies the TED output signal by a proportional value, $K_p$. The adder circuit 522 sums the resulting proportional signal with the phase sweep signal 520 to produce the NCO input signal 524.

The NCO circuitry 526 generates a discrete time, discrete valued synchronous wave form using the NCO input signal 524. The wave form may be characterized as a series of up or down pulses that are provided to the phase interpolator circuitry 414A to change the parameters of the ADC clock circuitry 416A. The PI Control output of NCO 520 is coupled to phase interpolator circuitry 414A.

The example primary timing loop circuitry 410 uses a first TED circuitry 502 to only generate error values when a symbol transition occurs, combines the error values with a second TED circuitry 504 that uses an early symbol decision and a late symbol decision to determine error value, and conditionally adds a high frequency word to the NCO input signal 524. In doing so, the example primary timing loop circuitry 410 completes the synchronization phase of the wake states 202, 216 in less than 6 μs.

Figure 6:
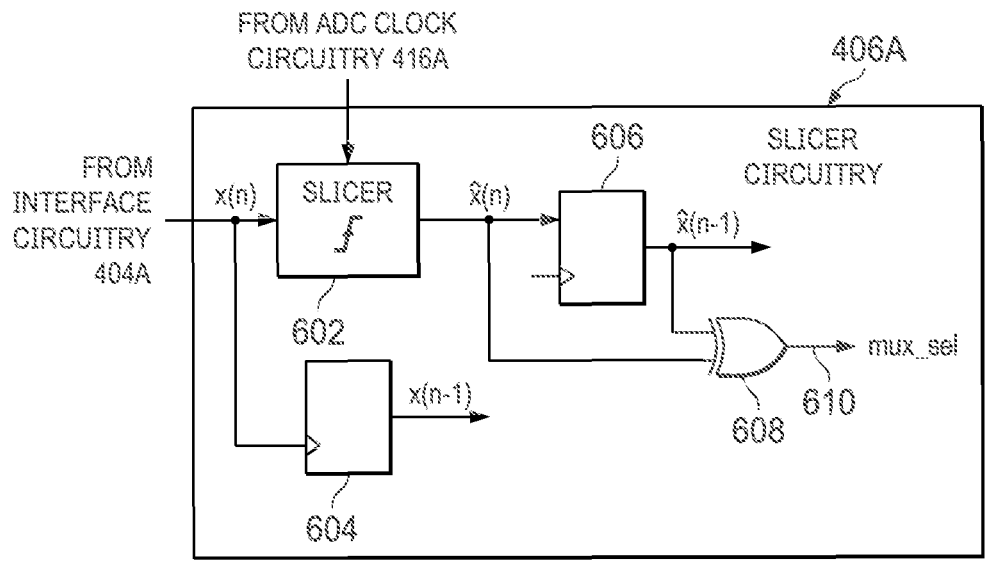
FIG. 6 is a block diagram of an example implementation of the slicer circuitry of FIG. 4.

FIG. 6 is a block diagram of an example implementation of the slicer circuitry 406A of FIG. 4. With modifications to the input and output connections, the circuitry of FIG. 6 can be used to implement slicer circuitry 406B. FIG. 6 includes example symbol slicer circuitry 602, a first flip flop circuit 604, a second flip flop circuit 606, an exclusive-OR (XOR) gate 608, and a multiplexer select signal 610.

The example symbol slicer circuitry 602 samples an incoming voltage x(n) from the example interface circuitry 404A according to a signal received from the example ADC clock circuitry 416A. The example slicer circuitry 406A then makes symbol decisions based on the sampled voltage. A symbol decision maps the sampled voltage, which is an analog value, and maps it to either a high voltage for a digital '1' or a low voltage for a digital '0'.

The first flip flop circuit 604 of FIG. 6 stores the current analog value sampled by the example symbol slicer circuitry 602 and outputs the previous analog value. The output of the first flip flop circuit 604, x(n−1), can be described as a one symbol delay of the incoming voltage x(n).

The second flip flop circuit 606 of FIG. 6 stores the current output voltage produced by the example symbol slicer circuitry 602 and provides the previous output voltage. The output of the first flip flop circuit 604, x̂(n−1), can be described as a one symbol delay of the symbol slicer circuitry 602 output signal x̂(n).

The XOR gate 608 of FIG. 6 indicates when a symbol transition occurs. The XOR gate 608 receives both the current slicer output signal x̂(n) and the previous output signal x̂(n−1) as inputs. The XOR gate 608 only produces a digital '1' when one of its two input signals is a digital '1'. When the two input signals are both a digital '1' or are both a digital '0', the XOR gate 608 produces a digital '0'. The output of the XOR gate 608 is the multiplexer select signal 610.

The example slicer circuitry 406A makes symbol decisions based off an incoming analog signal. The example slicer circuitry 406A additionally produces a multiplexer select signal 610 that indicates when there is a symbol transition (e.g., a change in voltage from low to high or vice versa) in the output signal produced by the example symbol slicer circuitry 602. Additional instances of example slicer circuitry 406B-406B may be implemented without the XOR gate 608 or multiplexer select signal 610. The multiplexer select signal 610 is discussed further with reference to FIG. 7.

Figure 7:
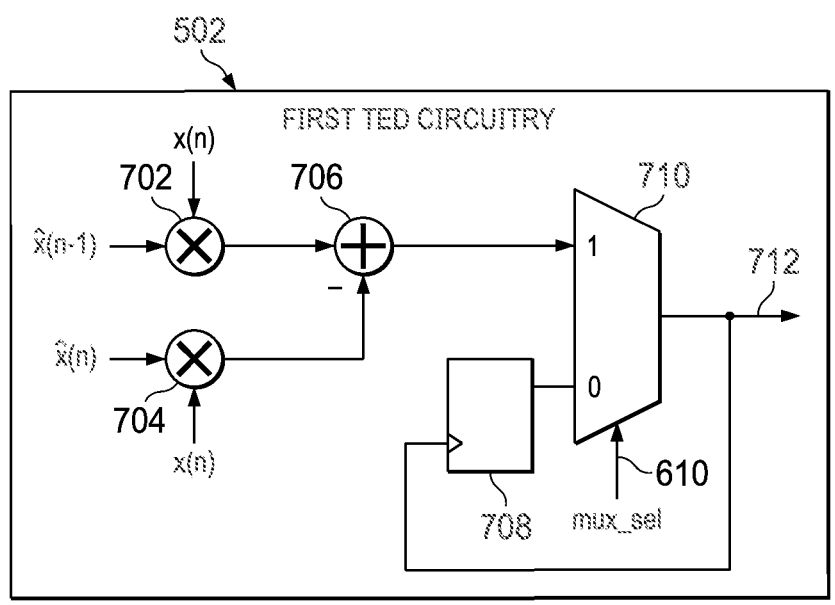
FIG. 7 is a block diagram of an example implementation of the first Timing Error Detector (TED) circuitry of FIG. 5.

FIG. 7 is a block diagram of an example implementation of the first Timing Error Detector (TED) circuitry 502 of FIG. 5 (and/or, in other examples, may be an example implementation of second TED 504). FIG. 7 includes a first multiplier 702, a second multiplier 704, an adder circuit 706, a flip flop circuit 708, example multiplexer circuitry 710, and an output signal 712.

The first multiplier 702 receives the current symbol input x(n) and output x̂(n−1). The second multiplier 704 receives the current symbol input x(n) and output x̂(n). Adder 706 subtracts the output of multiplier 704 from the output of multiplier 702. The first multiplier 702, second multiplier 704, and adder circuit 706 combine to produce an error value based on the Mueller and Müller TED equation $$MMTED = [x(n)*\hat{x}(n-1)] - [\hat{x}(n)*x(n-1)] \quad (2)$$

The error values, which collectively may be referred to as an MMTED signal, are continuously produced by the first multiplier 702, second multiplier 704, and adder circuit 706.

The multiplexer circuitry 710 generates a first TED output signal 712 that is provided to the adder circuit 505 of FIG. 5. The multiplexer circuitry 710 determines the value of the output signal based on the multiplexer select signal 610 of FIG. 6. If the multiplexer select signal 610 includes a digital '1' for the current symbol (n), the output signal 712 includes the MMTED signal produced for the current symbol (n). If the multiplexer select signal 610 includes a digital '0' for the current symbol (n), the multiplexer circuitry 710 uses the output the flip flop circuit 708 as the output signal 712.

The flip flop circuit 708 of FIG. 7 receives the output signal 712 of the current symbol output$_{712}$(n), stores the value in a buffer for one symbol, and provides the previous symbol output$_{712}$(n−1) to the multiplexer circuitry 710. Therefore, if the multiplexer select signal 610 includes a digital '0' for the current symbol (n), the output signal 712 includes the MMTED signal produced for the previous symbol (n−1).

The first TED circuitry 502 of FIG. 5 applies the MMTED equation to produce error values, but only updates the error values provided to the primary timing loop circuitry 410 when there is a symbol transition. Instead of updating, the first TED circuitry 502 holds the previous error value when there is no symbol transition. When there is no symbol transition for any two symbols, the current and previous symbols of the output signal (e.g., x̂(n) and x̂(n−1)) are the same value. As a result, the corresponding error values produced by in the MMTED signal are 0 or close to 0, depending on the difference between the current and previous slicer input signals x(n) and x(n−1). Therefore, the MMTED signals produced when there is no symbol transition lead to relatively small adjustments to the ADC clock phase. By providing the previous symbol transition TED error value when there is no symbol transition, the first TED circuitry 502 gives a larger error value and allows for larger adjustments to the ADC clock phase. These large adjustments to the ADC clock phase help to quickly complete the synchronization phase of the wake states 202, 216. Additionally, the first TED circuitry 502 improves upon other implementations of TED circuitry by avoiding the signal noise that is produced when said other TED circuitry implementations update an error value without a symbol transition.

Figure 8:
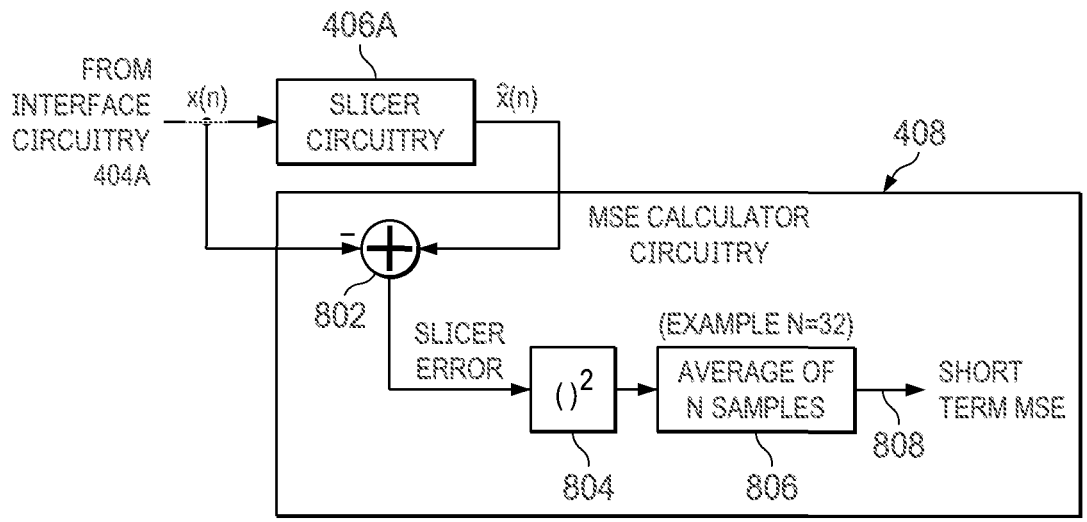
FIG. 8 is a block diagram of an example implementation of the Mean Square Error (MSE) calculator circuitry of FIG. 4.

FIG. 8 is a block diagram of an example implementation of the MSE calculator circuitry 408 of FIG. 4. The MSE calculator circuitry 408 includes an adder circuit 802, a scaler circuit 804, a mean calculator circuitry 806, and a short term MSE signal 808.

The adder circuit 802 of FIG. 8 receives the input signal x(n) and output signal x̂(n) of the current symbol voltages from the slicer circuitry 406A. In the example MSE calculator circuitry 408, the adder circuit 802 subtracts the value of the input signal from the output signal to produce a difference signal. In some examples, the adder circuit 802 subtracts the value of the output signal from the input signal to produce the difference signal.

The scaler circuit 804 of FIG. 8 squares the difference value for a given symbol by multiplying the difference value by itself. In doing so, the scaler circuit 804 receives an input that may be negative (e.g., the difference signal) and produces a scaler signal that is always positive.

The mean calculator circuitry 806 of FIG. 8 produces a rolling average using a small number of scaler values from the scaler signal. In the example MSE calculator circuitry 408, the rolling average includes the scalar signal values for 32 consecutive symbols. In other examples, the rolling average consists of scalar signal values for a different number of consecutive symbols. The rolling average values are collectively referred to as the short term MSE signal 808.

The MSE calculator circuitry 408 produces a short term MSE signal 808 that represents the symbol error for a small number of symbol decisions. When the short term MSE signal 808 is used by the example primary timing loop circuitry 410, it allows the multiplexer circuitry 514 to determine when the ADC clock phase is close to being at an optimal value to sample each symbol at the peak voltage 308. When the ADC clock phase is close to the optimal value, the short term MSE signal 808 falls below the threshold value of FIG. 5. This allows the multiplexer circuitry 514 (FIG. 5) to stop providing a high frequency word to the NCO circuitry 526. After the short term MSE signal 808 falls below the threshold value of FIG. 5, the multiplexer circuitry 514 provides a digital '0', which slows the rate in which the ADC clock parameters change relative to the high frequency word. This allows the primary timing loop circuitry 410 to converge upon the proper clock parameters to sample the input voltage at the optimal time for each symbol instead of passing the optimal point due to large changes in clock parameters.

Figure 9:
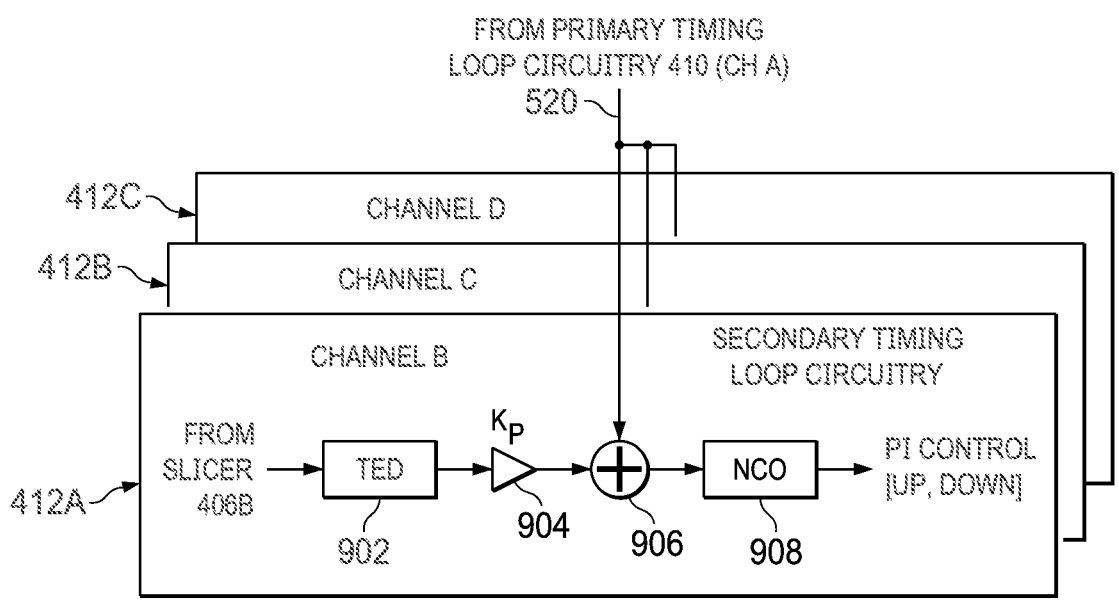
FIG. 9 is a block diagram of an example implementation of the secondary timing loop circuitry of FIG. 4.

FIG. 9 is a block diagram of an example implementation of the secondary timing loop circuitry 412 of FIG. 4. While FIG. 4 only shows the two communication lanes and the secondary timing loop circuitry 412A for simplicity, FIG. 9 illustrates the secondary timing loop circuitry 412B and 412C that are respectively included in third and fourth communication lanes required for Gigabit transmission as defined by the 1000BASE-T and EEE standards. Each instance of the secondary timing loop circuitry 412A, 412B and 412C include first TED circuitry 902, a gain 904, an adder circuit 906, and NCO circuitry 908.

The first TED circuitry 902 in FIG. 9 is implemented according to the following description pertaining to FIG. 10. Like the implementation in the example primary timing loop circuitry 410, the first TED circuitry 902 only provides error values that occurred when a symbol transition occurs, leading to faster changes in the ADC clock parameters. The first TED circuitry 902 of FIG. 9 produces a TED output signal. In some examples, the example secondary timing loop circuitry 412A also includes an instance of the second TED circuitry 504 and an additional adder circuit, which are implemented such that the TED output signal of FIG. 9 is a summation of the first TED error value and the second TED error value.

The gain 904 of FIG. 9 amplifies the TED output signal by a proportional value, $K_p$. The resulting proportional signal is provided to the adder circuit 906, which adds it to the phase sweep signal 520 (FIG. 5). The phase sweep signal 520 is provided by the example primary timing loop circuitry 410 to each instance of the secondary timing loop circuitry 412A-412C.

The NCO circuitry 908 of FIG. 9 receives the sum of the phase sweep signal 520 and the proportional signal produced by the adder circuit 906 as an input. The NCO circuitry 908 then uses the input to generate a discrete time, discrete valued synchronous wave form. The wave form may be characterized as a series of up or down pulses that are proportional to the amount of phase error in the ADC clock circuitry 416 (reference number 416 is used to collectively or individually refer to ADC clock circuitry included in a timing loop circuitry of a channel, such as 416B of channel B or 416C of channel C). Similarly, the up and down pulses are provided to the phase interpolator circuitry 414 (reference number 414 is used to collectively or individually refer to phase interpolator circuitry included in a channel, such as 414B of channel B or 414C of channel C) implemented in each communication lane, which in turn change the parameters of the ADC clock used in each communication lane.

The Ethernet PHY circuitry 106A implements the secondary timing loop circuitry 412A to take advantage of the fact that each instance of the ADC clock circuitry 416A is based off the same clocking source (e.g., a crystal oscillator or BAW device) and therefore experienced the same phase drift during the LPI interval 208. Because each set of ADC clock parameters require the same amount of adjustment, a single phase sweep signal 520 produced by the primary timing loop circuitry 410 allows for a unified sweep of ADC clock parameters across communication lanes. The unified sweep reduces the time it takes to find the correct ADC clock parameters relative to other solutions to synchronize signals where clock parameters were individually corrected on a lane by lane basis.

Furthermore, by sharing the phase sweep signal 520 across communication channels, the Ethernet PHY circuitry 106A only requires one communication channel to include the second gain 508 and flip flop circuit 510 required to generate the signal. As a result, costs associated with implementing hardware components are reduced for the secondary timing loop circuitry instances 412A-412C.

FIG. 10 is a graph of an illustrative example of an S-curve to characterize the first TED circuitry 502 and second TED circuitry 504 of FIG. 5. FIG. 10 includes a first S-curve 1002, a second S-curve 1004, and a third S-curve 1006.

An S-curve is a type of graph used to characterize the performance of various TEDs. The x axis of the S-curve of FIG. 10 represents an amount of time in a single symbol period. The symbol period is characterized in terms of timing error on a scale of −0.5 to +0.5. That is, for a given symbol period, −0.5 represents the earliest time in the period at which a signal could be sampled to determine a symbol, 0 represents the optimal time in the period to sample a signal (e.g., at the peak voltage 308), and +0.5 represents the latest time in the period at which a signal could be sampled to determine a symbol. They axis of the S-curve shows the output of various TEDs (i.e., the error values). The slope of an S-curve when the timing offset is 0 is referred to as the gain of the example TED. As the magnitude of the gain of TED increases, the time it takes to lock onto optimal ADC clock parameters decreases.

The first S-curve 1002 shows the gain of an MM-TED circuit 1602 used by some solutions to synchronize signals. The second S-curve 1004 shows the gain of the example first TED circuitry 502, and the third S-curve show the gain of TED output signal of the primary timing loop circuitry 410, where the error values of the first TED circuitry 502 and the second TED circuitry 504 are added together. When compared to one another, FIG. 10 illustrates that the third S-curve 1006 has the largest magnitude gain. Therefore, the primary timing loop circuitry 410 has improved upon other solutions to synchronize signals by reducing the time it takes to find the optimal ADC clock parameters.

Figure 11A:
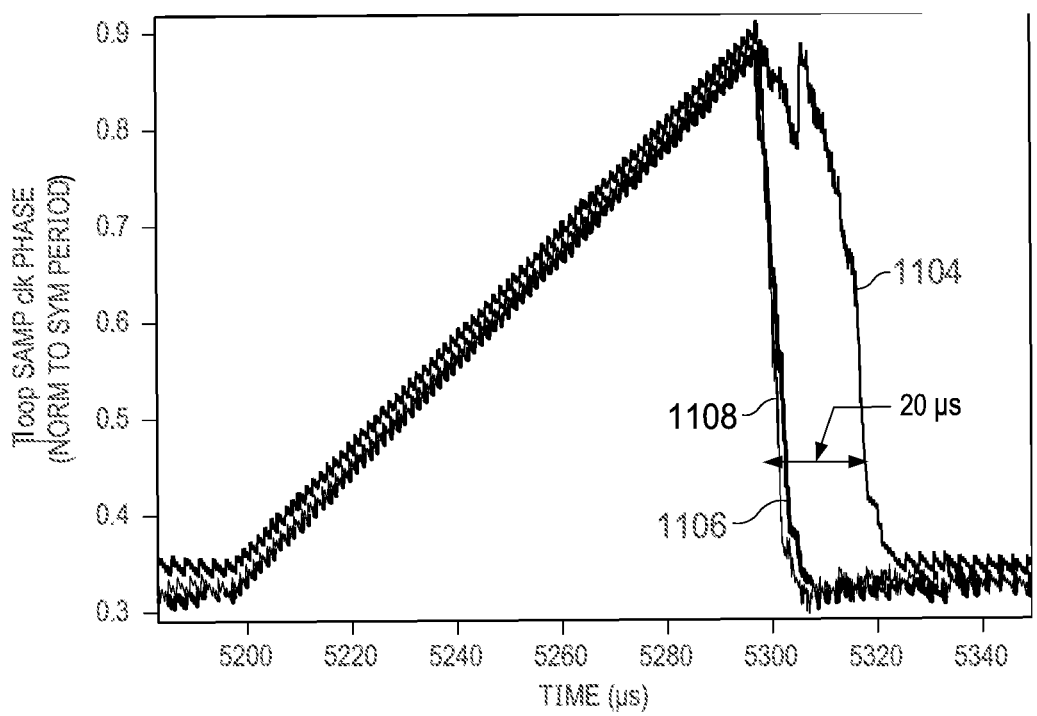
FIGS. 11A and 11B are graphs of an illustrative example of lock times corresponding to the first TED circuitry and second TED circuitry of FIG. 5.
Figure 11B:
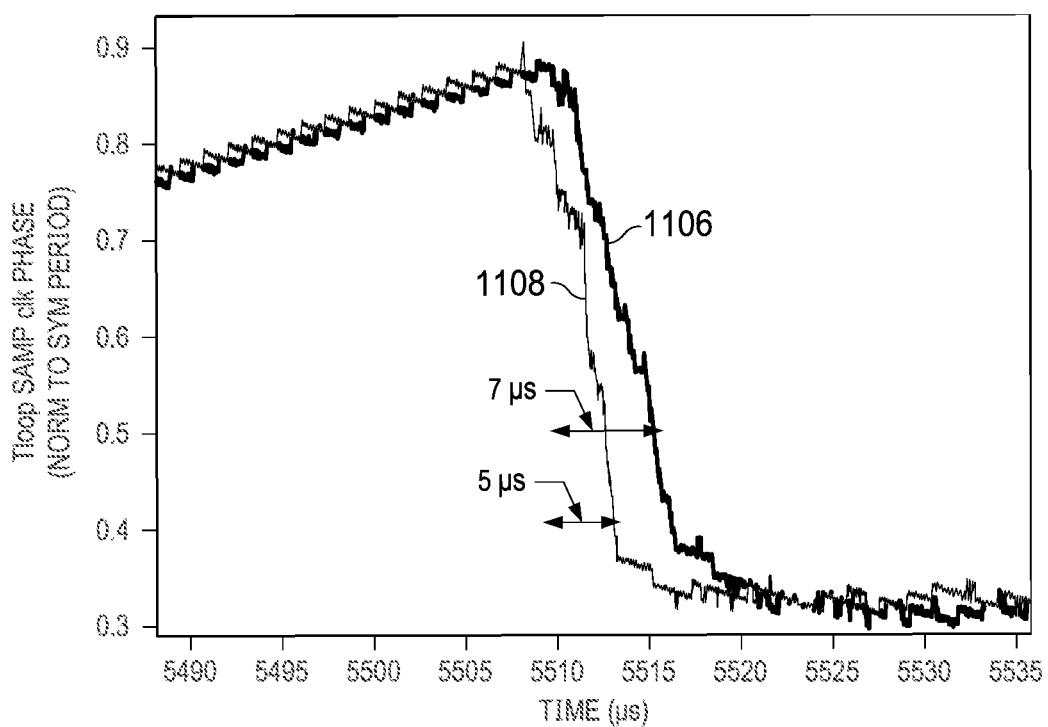

FIGS. 11A and 11B are graphs of an illustrative example of lock times corresponding to the first TED circuitry and second TED circuitry of FIG. 5. FIG. 11A includes a first graph 1100 with a first plot 1104, a second plot 1106, and a third plot 1108. FIG. 11B includes a second graph 1102 with the second plot 1106 and third plot 1108.

The first graph 1100 of FIG. 11A shows three simulations of Ethernet PHY receiver circuits, where each example is implemented by a different TED configuration as described in the foregoing plot descriptions. Specifically, the first plot 1104 represents an MM-TED circuit 1602 from the second solution of FIGS. 5 and 6, the second plot 1106 shows the first TED circuitry 502, and the third plot 1108 shows an addition of the first TED circuitry 502 and second TED circuitry 504 as seen in the primary timing loop circuitry 410.

The first plot 1104, second plot 1106, and third plot 1108, all show how, for a given TED, the clock phase normalized to a symbol's period changes over time. In both the first graph 1100 and second graph 1102, the clock phase normalized to a symbol's period is on the y axis and time is on the x axis. Under normal operation of the active state shown in FIG. 1, the clock phase normalized to a symbol's period remains near 0.

At roughly 5200 µs, the three simulations of Ethernet PHY receiver circuits all enter an LPI interval 208. The simulations emulate a phase error that would be caused by drifts in the ADC clock circuitry 416A-416B, as displayed by the increased y value from roughly 5200 μs to roughly 5288 μs on each of the three plots. At roughly 5288 μs, each of the examples Ethernet PHY receiver circuits exits the LPI interval 208. Furthermore, the simulations emulate the largest possible initial phase error on each Ethernet PHY receiver circuit so that the worst case scenario lock time can be determined.

Figure 17:
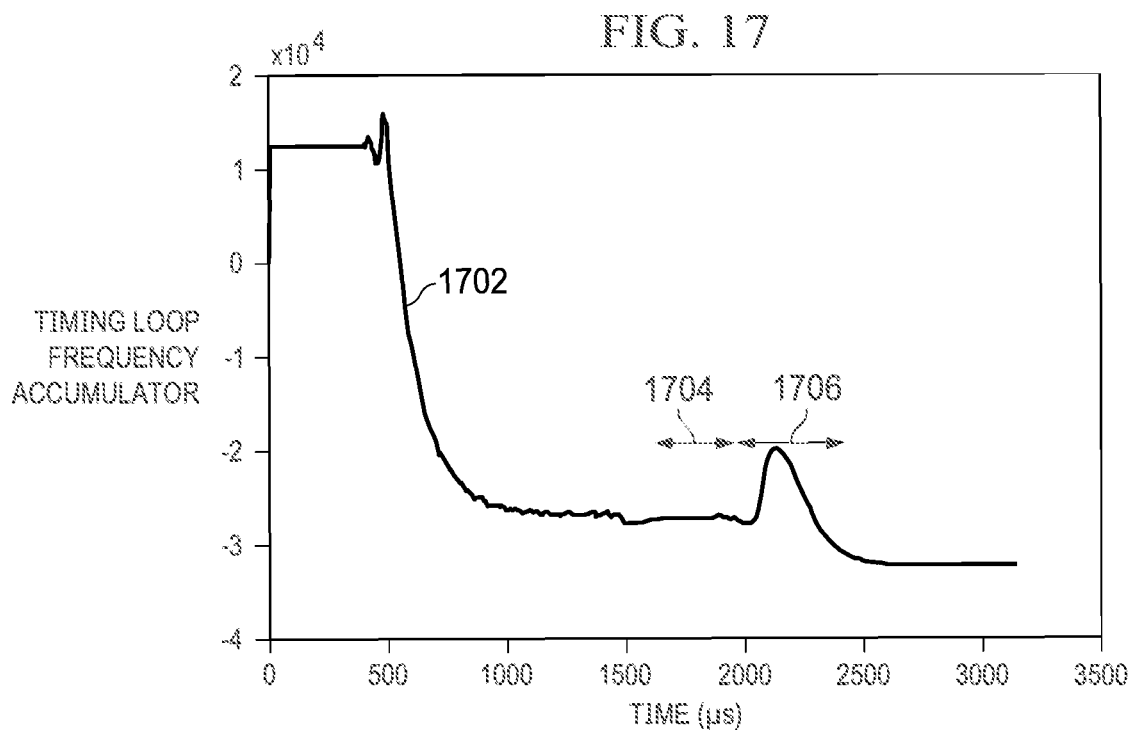
FIG. 17 is a graph of a first solution to synchronize signals in Ethernet protocols.

The first plot 1104 shows that the time it takes for the Ethernet PHY receiver circuit implemented by the MM-TED circuit 1602 to lock onto the optimal ADC clock parameters and complete the synchronization phase of the wake states 202, 216 is approximately 20 μs, which matches as a worst case scenario with the 14 μs average lock time 1706 described in FIG. 17.

The second graph 1102 of FIG. 11B shows the lock time for the second plot 1106 and third plot after an additional simulation of an LPI interval 208 with the largest possible initial phase error. The second plot 1106 shows that the Ethernet PHY receiver circuit implemented by the first TED circuitry 502 took 7 μs to complete the synchronization phase as a worst case scenario, and the third plot 1108 shows the Ethernet PHY receiver circuit implemented by combination of the first TED circuitry 502 and the second TED circuitry 504 took 5 μs to complete the synchronization phase in a worst case scenario. FIGS. 11A and 11B illustrate that the example Ethernet PHY receiver circuit meets the 6 μs window for the synchronization phase required by EEE and 1000BASE-T when implemented with a combination of the first TED circuitry 502 and the second TED circuitry 504 as described in FIG. 5.

Figure 12:
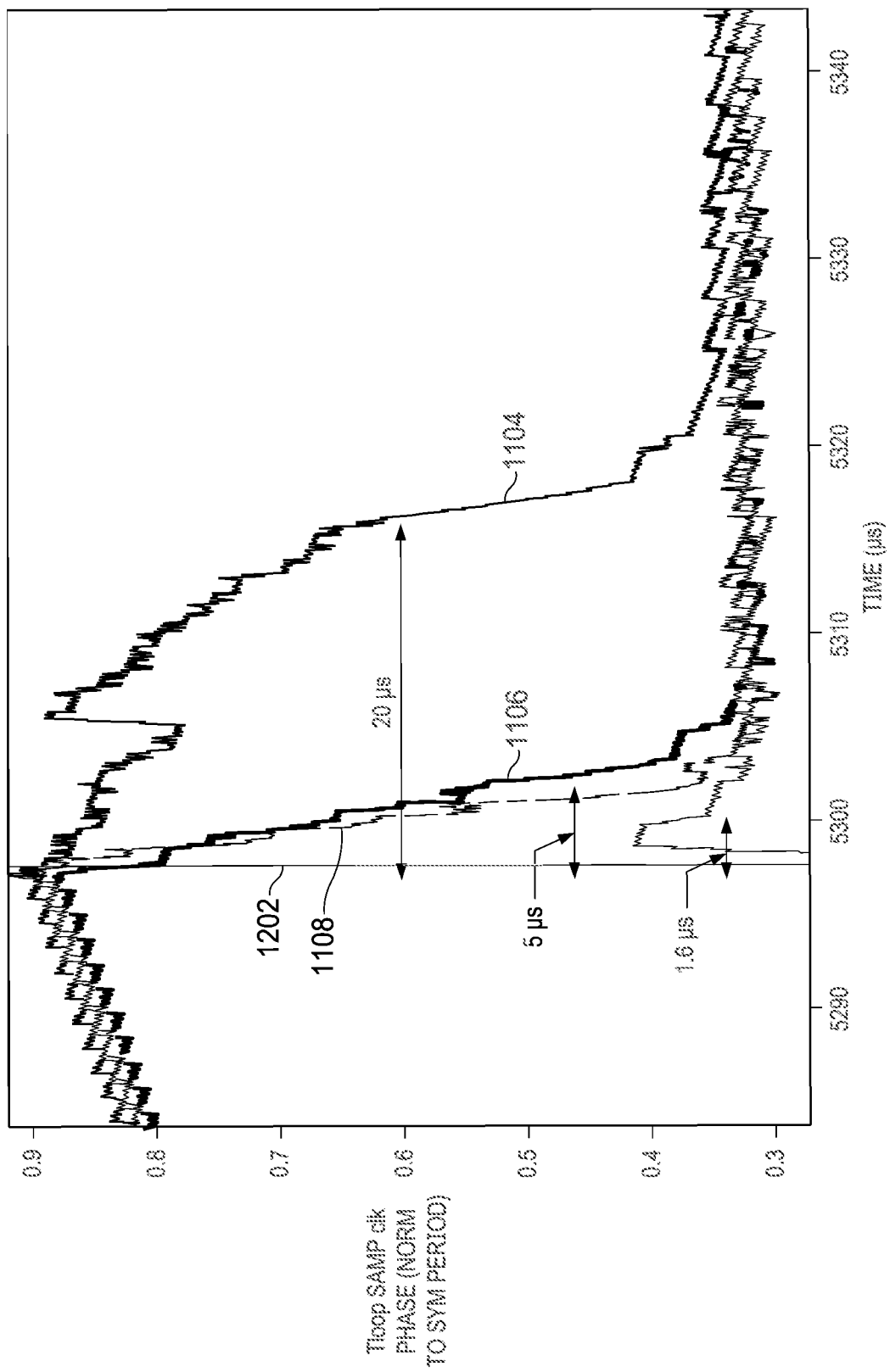
FIG. 12 is a graph of an illustrative example of lock times corresponding to the Ethernet PHY receiver circuitry of FIG. 4.

FIG. 12 is an illustrative example of lock times corresponding to different Ethernet PHY receivers (including one that include the circuitry of FIG. 7). FIG. 12 includes the first plot 1104, second plot 1106, and third plot 1108 of FIGS. 11A and 11B, and an additional fourth plot 1202. The fourth plot 1202 shows an emulation of the example Ethernet PHY circuitry 106A (FIG. 1) that includes first TED circuitry 502 of FIG. 7. The example Ethernet PHY circuitry 106A implements both the combination of the first TED circuitry 502 and second TED circuitry 504 and a phase sweep signal 520 that is shared across communication lanes.

The fourth plot shows that the Ethernet PHY circuitry 106A took 1.6 μs to complete the synchronization phase as a worst case scenario with the largest possible initial phase error. Therefore, the Ethernet PHY circuitry 106A provides additional time savings to complete the synchronization phase under 6 μs when implemented with both the combination of the first TED circuitry 502 and second TED circuitry 504 and a phase sweep signal 520 that is shared across communication lanes. As a result, the example Ethernet PHY circuitry 106A meets the 6 μs synchronization window and the 16.5 μs wake state window defined by EEE for 1000BASE-T communications when other solutions fail to do so.

Figure 13:
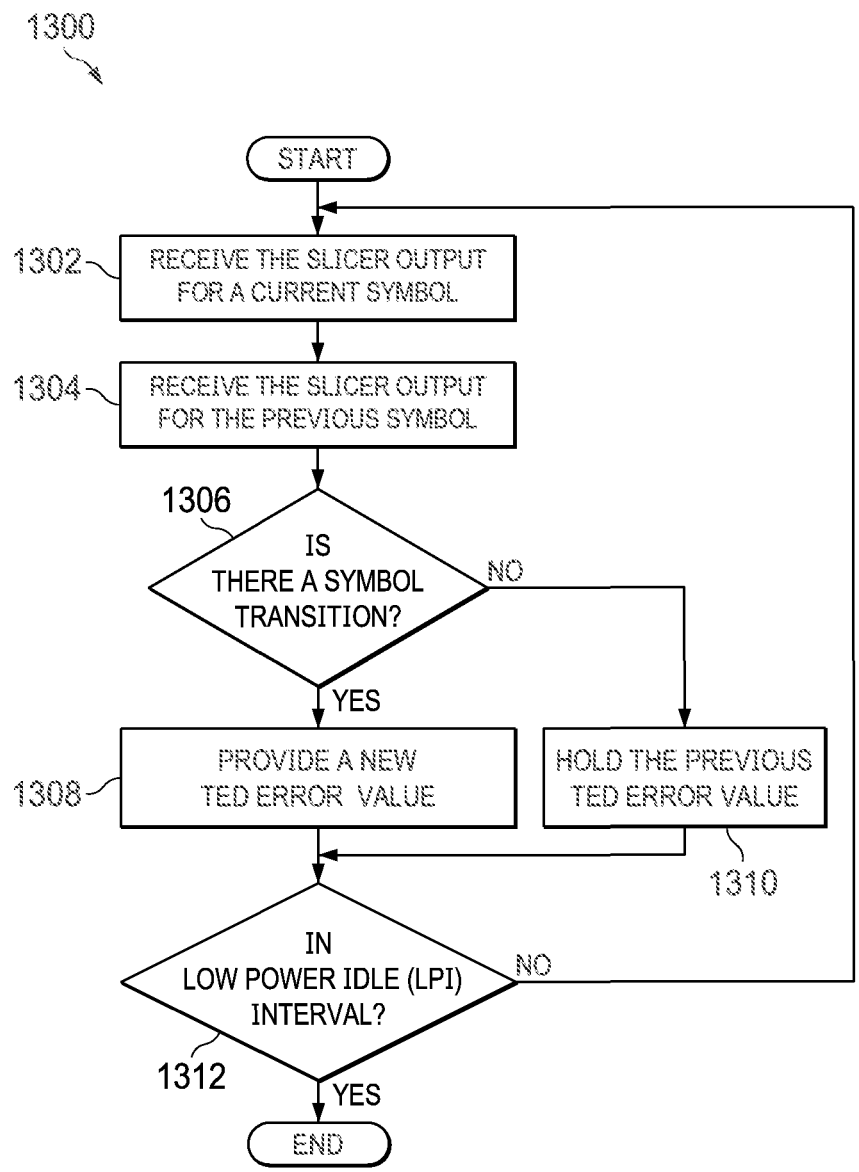
FIG. 13 is a flowchart representative of example operations that may be executed and/or instantiated by the slicer circuitry of FIG. 6 and the first TED circuitry of FIG. 7 to provide an error value.

FIG. 13 is a flowchart representative of example operations 1300 that may be executed and/or instantiated by the slicer circuitry 406A of FIG. 4 and the first TED circuitry 502 of FIG. 7 to provide an error value. The operations 1300 of FIG. 13 begin when the XOR gate 608 of FIG. 6 receives the slicer output for a current symbol, x̂(n), (Block 1302). The slicer output for the current symbol is either a high or a low voltage and is generated by the symbol slicer circuitry 602 of FIG. 6.

The XOR gate 608 of FIG. 6 receives the slicer output for the previous symbol, x̂(n−1), (Block 1304). The slicer output of the previous symbol is provided by the second flip flop circuit 606 of FIG. 6, which implements a one symbol delay of the output signal from the example symbol slicer circuitry 602.

The XOR gate 608 of FIG. 6 determines whether there was a symbol transition between the current and previous slicer output values (Block 1306), by performing an exclusive-OR operation on the current symbol slicer output voltage and the previous symbol slicer output voltage. The output of the exclusive-OR operation may be referred to as the multiplexer select signal 610.

If, as determined based on the output of the XOR gate 608, there was a symbol transition between the current and previous slicer output values (e.g., the multiplexer select signal 610 is a high voltage), the multiplexer circuitry 710 provides a new TED error value using the current symbol (n) and the previous symbol (n−1) (Block 1308). The TED error value is provided by the Mueller and Müller TED equation (equation (2)).

If, as determined based on the output of the XOR gate 608, there was not a symbol transition between the current and previous slicer output values (e.g., the multiplexer select signal 610 is a low voltage), the multiplexer circuitry 710 holds the previous TED error value (Block 1310). The previous TED error value represents the TED error value that was calculated during the most recent symbol transition.

The symbol slicer circuitry 602 determines whether the Ethernet PHY circuitry 106A is in an LPI interval 208 (Block 1312). If the Ethernet PHY circuitry 106A is in an LPI interval 208, the example primary timing loop circuitry 410 has no power and the operations 1300 end. If the Ethernet PHY circuitry 106A is not in an LPI interval 208, the reference frame shifts to mark a different window of time as the current symbol, and the XOR gate 608 accesses the slicer output for the current symbol at block 1302.

Figure 14:
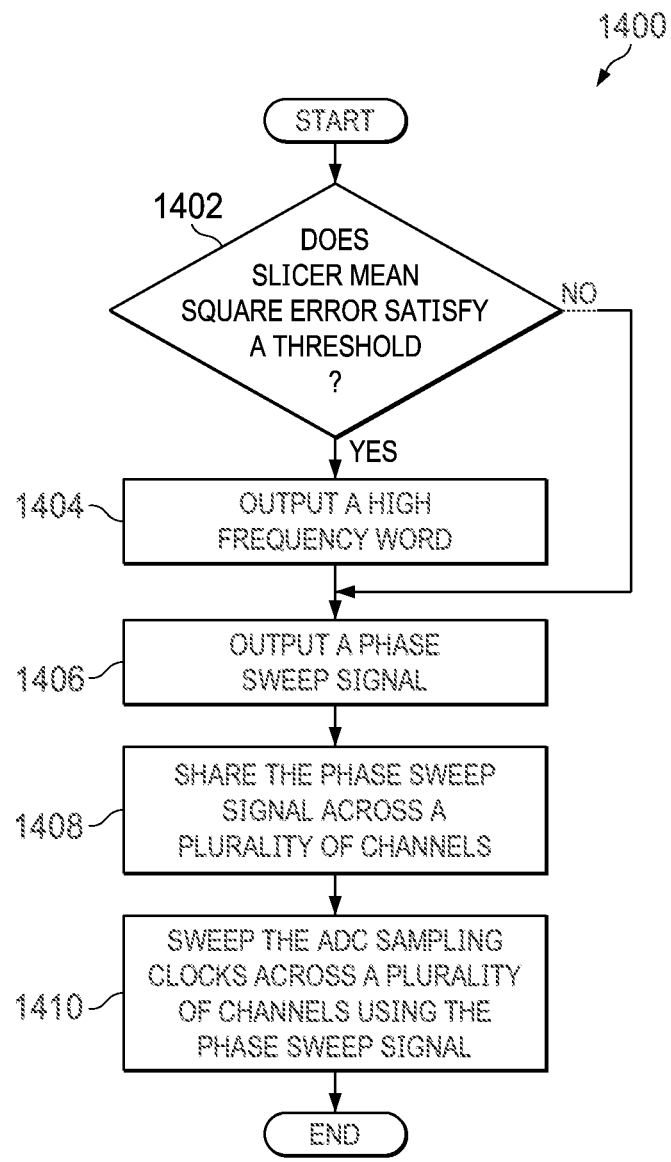
FIG. 14 is a flowchart representative of example operations that may be executed and/or instantiated by the primary timing loop circuitry and secondary timing loop circuitry of FIGS. 5 and 9 to correct ADC clock parameters.

FIG. 14 is a flowchart representative of example operations 1400 that may be executed and/or instantiated by the primary timing loop circuitry 410 and secondary timing loop circuitry 412 of FIG. 7 to correct ADC clock parameters. The example operations 1400 begin when the example comparator circuitry 518 determines whether the slicer MSE satisfies a threshold (Block 1402). The slicer MSE satisfies the threshold of block 1402 when the short term MSE signal 808 provided by the slicer circuitry 406A is greater than a pre-determined threshold value. The pre-determined threshold value may be stored in any form of memory accessible to the Ethernet PHY circuitry 106A. If the slicer MSE satisfies the threshold, the operations 1400 continue to block 1404. If the slicer MSE does not satisfy the threshold, the operations 1400 skip block 1404 and proceed to block 1406.

The example multiplexer circuitry 514 outputs a high frequency word. (Block 1404). A high frequency word consists of voltages representative of digital '1' and digital '0' bits transitioning at a high frequency. The multiplexer circuitry 415 outputs a high frequency word based on the mux select signal 516 as described above with reference to FIG. 5. When the example multiplexer circuitry 514 does not output a high frequency word, the example multiplexer circuitry 514 outputs a continuous low voltage representative of repeating digital '0' bits.

The adder circuit 522 outputs a phase sweep signal 520. (Block 1406). The phase sweep signal 520 is a summation of the output of multiplexer 514 and the symbol delay signal 512 as described above with reference to FIG. 5.

The primary timing loop circuitry 410 provides the phase sweep signal 520 to each instance of the secondary timing loop circuitry 412 (Block 1408). While only one instance of the secondary timing loop circuitry 412A is displayed in FIG. 4 for simplicity, the Ethernet PHY circuitry 106A may implement additional instances in additional communication lanes. For example, 1000BASE-T Gigabit connections require three instances of secondary timing loop circuitry 412A for a total of four communication lanes.

The phase interpolator circuitry 414 of each communication lane sweep the ADC clock phase parameters using the phase sweep signal 520 (Block 1410). The phase interpolator circuitry 414 adjusts ADC clock parameters based on up and down pulses produced by the NCO circuitry 526 and NCO circuitry 908, which receives a summation of the phase sweep signal 520 and a proportional gain of a TED output as an input. As a result, the phase sweep signal 520 allows the clock parameters for each instance of the ADC clock circuitry 416A to change by the same amount until the slicer circuitry 406A samples the incoming voltage at the optimal time (i.e., when the peak voltage 308 occurs) within each pulse. The operations 1400 end after block 1410.

Figure 15:
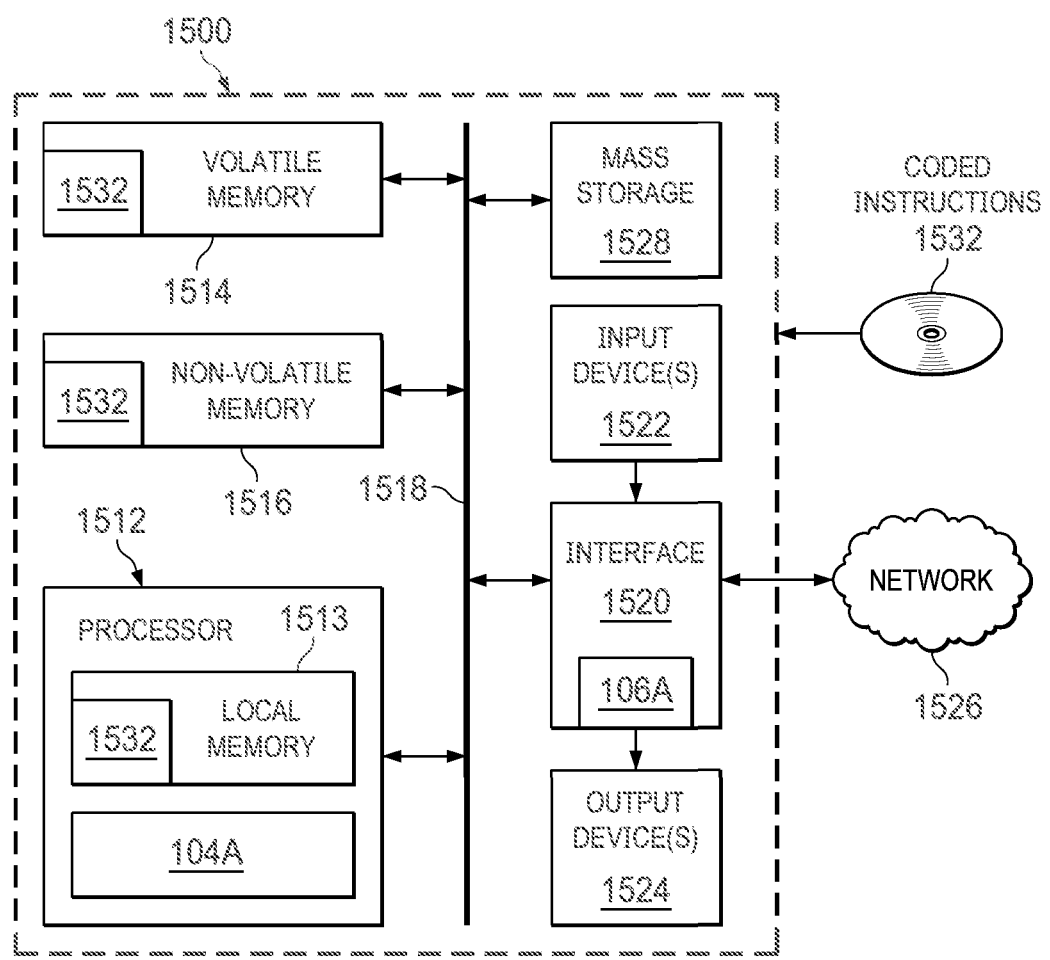
FIG. 15 is a block diagram of an example processing platform including processor circuitry structured to execute the example operations of FIGS. 13 and 14 to implement the communication device of FIG. 1.

FIG. 15 is a block diagram of an example processor platform 1500 structured to execute and/or instantiate the machine readable instructions and/or the operations of FIGS. 13, 14 to implement the example communication device 102A of FIG. 1. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs, microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements example processor circuitry 104A.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output device(s) 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1532 may be stored in the mass storage device 1528, in the volatile memory 1514, in the non-volatile memory 1516, and/or on a removable non-transitory computer readable storage medium such as a CD or DVD.

Figure 16:
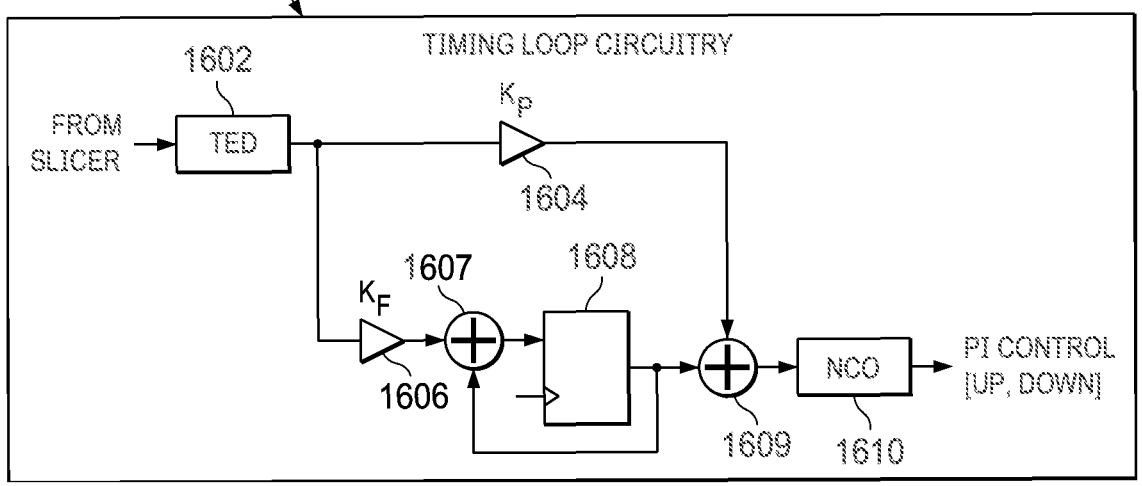
FIG. 16 is a block diagram of an implementation of timing loop circuitry.

FIG. 16 is a block diagram of an implementation of timing loop circuitry. Timing loop circuitry 1600 includes a Mueller and Müller Timing Error Detector (MM-TED) circuit 1602, a first gain 1604, a second gain 1606, an adder circuit 1607, a flip flop circuit 1608, an adder circuit 1609, and a NCO circuit 1610. Timing loop circuitry 1600 may be included in a other implementations of Ethernet PHY circuitry with EEE, such as the implementation described in reference to FIG. 18.

The MM-TED circuit 1602 of FIG. 16 determines an error value that, for a given symbol, is proportionate to the amount of time between when the symbol should optimally be sampled (which is at the peak voltage 308), and when the symbol was actually sampled. To calculate the error value, the MM-TED circuit 1602 receives the analog signal before sampling, represented as x(n), and the analog signal after it has been sampled, represented as x̂(n). In the block diagram of FIG. 16, an Ethernet PHY circuit uses a slicer circuit to sample the analog signal and make a symbol decision. The MM-TED circuit 1602 defines the error value by the MMTED equation (equation (2)).

The first gain 1604, second gain 1606, adder circuit 1607, flip flop circuit 1608, and adder circuit 1609 of FIG. 16 proportionally change the output signal produced by the MM-TED circuit 1602 to produce a new signal, which may be referred to as an NCO input signal. The NCO input signal is defined by $$NCO_{input} = K_p(n) + [K_f(n) + K_f(n-1)] \quad (3)$$

where n represents a current symbol in the MM-TED circuit 1602 output signal and (n−1) represents the previous symbol in the MM-TED circuit 1602 output signal.

The NCO circuit 1610 of FIG. 16 receives the NCO input signal and uses it to generate a discrete time, discrete valued synchronous wave form. The wave form may be characterized as a series of up or down pulses that are proportional to the amount of phase error in the ADC clock. The NCO circuit 1610 provides the wave form to a phase interpolator circuit that makes precise adjustments to the phase of the ADC sampling clock. When the timing loop circuitry of an Ethernet PHY circuit is powered on, it may run continuously to keep the clock error below a pre-determined error threshold. When the timing loop circuitry is powered off during the LPI interval 208, the phase error in the ADC sampling clock continues to accumulate. During the wake states 202, 216, the timing loop circuitry is required to reduce the clock error below a pre-determined error threshold within 6 μs for 1000BASE-T transmission. If an Ethernet PHY is implemented with the timing loop circuitry 1600, it is unable to meet the 6 μs requirement.

FIG. 17 is a graph of a first solution to synchronize signals in Ethernet protocols. FIG. 17 includes a frequency accumulator signal 1702, an LPI interval 1704, and a lock time 1706.

The first solution described in FIG. 17 uses a sequencer circuit to control the timing loop bandwidth. The timing loop bandwidth is a parameter that characterizes the close loop transfer function defined by the timing loop circuitry 1600 of FIG. 16. Implementations of the first solution may include, but are not limited to, Texas Instruments® DP83822 and DP83867 devices.

The frequency accumulator signal 1702 represents adjustments made by timing loop circuitry to correct the phase and frequency drifts of the clock circuits that feed ADC circuitry. As such, the frequency accumulator signal 1702 can represent how control of the timing loop bandwidth affects the lock time 1706. In FIG. 17, an Ethernet PHY circuit entered the LPI interval 1704 between 1500 μs and 2000 μs of the time stamps shown of the x axis. To correct for the phase and drift experienced by the clocks during the LPI interval 1704, the frequency accumulator signal 1702 should change before settling at a given value. The time it takes for the frequency accumulator signal 1702 to change and settle is the lock time 1706. In FIG. 17, the lock time 1706 is above 300 μs. As such, first solutions to synchronize signals fail to complete the synchronization phase in under 6 μs as defined by EEE for 1000BASE-T. In other implementations, lock times seen by the first solution to synchronize signals may be a different value.

Figure 18A:
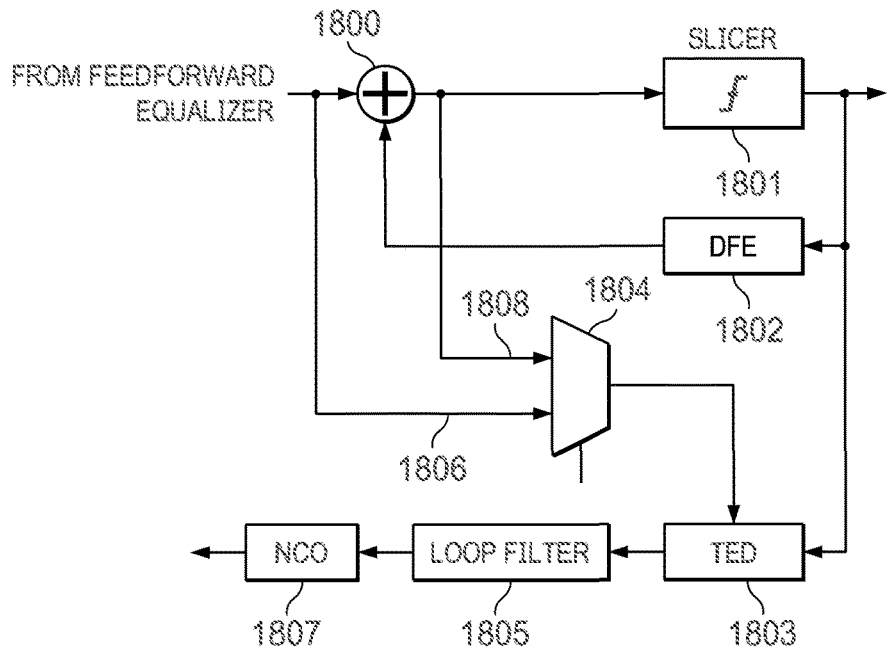
FIGS. 18A and 18B are a block diagram and flow chart, respectively, of an implementation of a second solution to synchronize signals in Ethernet protocols.
Figure 18B:
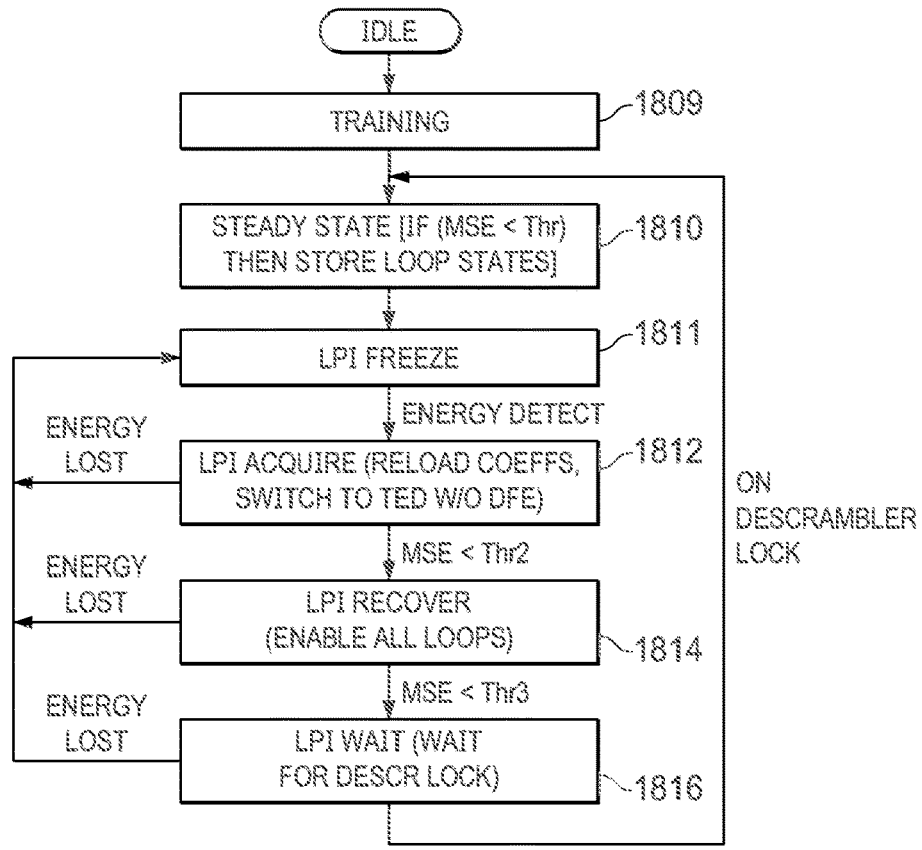

FIGS. 18A and 18B are a block diagram and flow chart, respectively, of an implementation of a second solution to synchronize signals in Ethernet protocols. FIG. 18A includes an adder circuit 1800, slicer circuitry 1801, Decision Feedback Equalizer (DFE) circuit 1802, TED circuitry 1803, a multiplexer circuit 1804, a loop filter 1805, first TED input signal 1806, an NCO 1807, and a second TED input signal 1808. FIG. 18B includes a training state 1809, a steady state 1810, an LPI freeze state 1811, an LPI acquire state 1812, an LPI recover state 1814, and an LPI wait state 1816. The second solution illustrated in FIGS. 18A and 18B may be implemented by devices that include but are not limited to the Texas Instruments® DP83826 chip. All or a portion of the method of FIG. 18B may be implemented using different circuitry than the circuitry illustrated in FIG. 18A.

The adder circuit 1800 sums the output of the DFE circuit 1802 and a feedforward equalizer. The feedforward equalizer receives an analog signal that has been transmitted over a medium 108 and reduces distortions due from the medium 108 by applying a finite impulse response transfer function.

The slicer circuitry 1801 of FIG. 18A receives the output of the adder circuit 1800 and uses it to determine symbols as described previously. The symbols are used as inputs to the DFE circuit 1802, which performs the symbol correction described previously. In general, a DFE circuit corrects symbols by receiving a symbol decision (i.e., a high voltage for a digital '1' or a low voltage for a digital '0') from a slicer circuit, delaying the value of the symbol decision by one pulse, and subtracting the value of the symbol decision from the received voltage of the next symbol. Although not illustrated in FIG. 16 or FIG. 17, the first solution to synchronize signals coupled a DFE circuit to the MM-TED circuit 1602 such that the slicer input x(n) in the foregoing MMTED equation would be represented by the second TED input signal 1808. The second TED input signal 1808 represents the symbol voltages after the DFE circuit has already attempted to perform symbol correction.

The TED circuitry 1803 produces error values using the MMTED equation. The multiplexer circuit 1804 of FIG. 18A determines which values should be provided to the TED circuitry 1803 as a slicer input x(n). The multiplexer circuit 1804 makes the decision depending on the state of the receiver channel.

After a training state 1809 and a steady state 1810, the receiver channel may enter the LPI freeze state 1811 if data is not received in a given amount of time. If the receiver channel implemented by the second solution is in an LPI freeze state 1811, also referred to as the LPI interval 208 in FIG. 1, the timing loop circuitry is powered off and the TED circuitry 1803 does not receive any input.

Upon energy detection, the Ethernet PHY circuit enters the wake states 202, 216. The second solution to synchronize signals divides a given wake state to include the LPI acquire state 1812 and LPI recover state 1814 as shown in FIG. 18B. In the LPI acquire state 1812, the receiver channel loads the last known clock parameters from an ADC clock circuit and the multiplexer circuit 1804 provides the first TED input signal 1806 to the TED circuitry 1803. The first TED input signal 1806 does not include symbol correction performed by the DFE circuit 1802. The second solution to synchronize signals monitors the Mean Square Error (MSE) value corresponding to the symbol error rate falls below a pre-determined threshold value. Once the MSE value falls below the pre-determined threshold value, the Ethernet PHY circuit enters the LPI recover state 1814 and the multiplexer provides the second input TED signal 1808 to the TED circuit. The LPI acquire state 1812 differs from the LPI acquire state discussed in reference to FIG. 5 because the LPI acquire state of FIG. 5 concludes when the short term MSE signal 808 falls below a threshold value. In contrast, the conclusion of the LPI acquire state 1812 is based on an MSE value that is not short term, but instead is based on a greater number of symbols. In some examples, the MSE value used to determine whether the LPI acquire state 1812 is done may be based on the total number of symbols received since the start of the LPI acquire state 1812.

The second input TED signal 1808 is provided to the TED circuit throughout the LPI recover state 1814, LPI wait state 1816, and steady state. In FIG. 2, the steady state is referred to as the active states 204, 218 that begin once the wake states 202, 216 end. In the steady state 1810, the TED circuitry 1803 may produce error values that are used by the loop filter 1805 to ultimately determine the rate at which the NCO 1807 changes an amount of phase parameters.

FIG. 19 is a graph that describes the performance of the second solution to synchronize signals in Ethernet protocols. FIG. 19 includes a first signal 1902, a second signal 1904, and a third signal 1906.

The first signal 1902 shows how, when the first solution of FIG. 17 implements timing loop synchronization, the MSE of symbol decisions converges over time. As described in FIG. 17, the MSE for the first solution converges, and the synchronization phase of the wake states 202, 216 completes, in roughly 300 μs.

The second signal 1904 shows how, when the second solution of FIGS. 18A and 18B implements timing loop synchronization but does not re-load previous clock parameters in the LPI acquire state 1812, the MSE of symbol decisions converges over time. The second signal 1904 takes roughly 45 μs for the MSE to converge and the synchronization phase to complete.

The third signal 1906 shows how, when the second solution of FIGS. 18A and 18B implements timing loop synchronization and re-loads previous clock parameters in the LPI acquire state 1812, the MSE of symbol decisions converges over time. The third signal 1906 takes roughly 14 μs for the MSE to converge and the synchronization phase to complete.

The third signal 1906 shows how the second solution to synchronize signals of FIGS. 18A and 18B improves upon the first solution to synchronize signals of FIG. 17 by reducing the time to complete the synchronization phase. In doing so, the second solution to synchronize signals of FIGS. 18A and 18B supports the wake state within EEE required to support 200BASE-T, an IEEE standard for 100 Mbps Ethernet connections. However, neither the first or second solutions meet the 6 μs synchronization window needed to satisfy the 16.5 μs wake state requirement for the 1 Gbps connections defined in 1000BASE-T and EEE.

From the foregoing, it will be appreciated that example systems, methods, apparatus, and articles of manufacture have been disclosed that lock onto optimal ADC clock parameters within the 6 μs window required for communication standards such as 1000BASE-T and EEE. Disclosed systems, methods, apparatus, and articles of manufacture improve the efficiency of using a computing device by only updating a first TED error value when a symbol transition occurs and generating a phase sweep signal to change the clock parameters of each communication lane by the same amount. Disclosed systems, methods, apparatus, and articles of manufacture are accordingly directed to one or more improvement(s) in the operation of a machine such as a computer or other electronic and/or mechanical device.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. While the circuitry described above may be implemented using analog circuitry, digital circuitry, one or more processors or other computing devices (e.g., a microcomputer, a microcontroller, etc.), a state machine and/or memory, some or all of the circuitry may, instead, be implemented using software that may be stored in memory and running on one or more processors and/or other computing devices.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero. Modifications are possible in the described examples, and other examples are possible within the scope of the claims.

Example methods, apparatus, systems, and articles of manufacture to synchronize Ethernet signals are disclosed herein. Further examples and combinations thereof include the following.

Example 1 includes a method comprising receiving an analog signal corresponding to a first Analog to Digital Converter (ADC) clock of a plurality of ADC clocks, determining symbols based on the analog signal, indicating a symbol transition in the symbols, updating an error value in response to an indication of a symbol transition, determining a frequency of voltage oscillations based on at least the error value, and changing a plurality of phase parameters corresponding to the plurality of ADC clocks at a rate given by the frequency of voltage oscillations.

Example 2 includes the method of example 1, further including calculating a Mean Square Error (MSE) value of digital symbols from the slicer output signal.

Example 3 includes the method of example 2, further including determining, comparing the MSE value of the symbols to a threshold value.

Example 4 includes the method of example 3, further including determining, in response to a determination the MSE value of the symbols being greater than a threshold value, the frequency of voltage oscillations to be a first frequency used to change the plurality of phase parameters by a first amount, and determining, in response to the MSE value of the symbols being less than the threshold value, the frequency of voltage oscillations to be a second frequency change the plurality of phase parameters by a second amount, wherein the second frequency is less than the first frequency and the second amount of change is less than the first amount of change.

Example 5 includes the method of example 1, further including determining the frequency of voltage oscillations in a first communication lane corresponding to the first ADC clock, and sharing the frequency with a plurality of secondary communication lanes corresponding to the plurality of ADC clocks so that the plurality of phase parameters corresponding to the plurality of ADC clocks are changed at a same rate.

Example 6 includes the method of example 1, further including holding, when a symbol transition is not indicated, the error value at a previous value.

Example 7 includes the method of example 1, wherein the error value is a first error value, further including calculating the first error value using a Mueller and Müller Timing Error Detector, calculating a second error value using an Early-Late Timing Error Detector, and determining the frequency of voltage oscillations based on a sum of the first error value and the second error value.

Example 8 includes the method of example 1, wherein the analog signal is an Ethernet signal.

Example 9 includes the method example 1, wherein the change in the plurality of phase parameters corrects phase errors in the plurality of ADC clocks.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to synchronize signals comprising:
    interface circuitry operable to be coupled to a transmission medium;
    slicer circuitry having an input coupled to the interface circuitry and having an output, the slicer circuitry configured to receive an analog signal corresponding to a first Analog to Digital Converter (ADC) clock of a plurality of ADC clocks and operable to determine symbols based on the analog signal;
    logic circuitry having an input coupled to the output of the slicer circuitry and having an output, the logic circuitry operable to indicate a symbol transition in the symbols;
    timing error detector circuitry having an input coupled to the output of the logic circuitry and having an output, the timing error detector circuitry operable to, in response to an indication of a symbol transition, update an error value;
    timing loop circuitry having an input coupled to the output of the timing error detector circuitry and having an output, the timing loop circuitry operable to determine a frequency of voltage oscillations based on the error value; and
phase interpolator circuitry having an input coupled to the output of the timing loop circuitry and having an output, the phase interpolator circuitry operable to change a plurality of phase parameters corresponding to the plurality of ADC clocks based on the frequency of voltage oscillations.

2. The apparatus of claim 1, further including Mean Square Error (MSE) calculator circuitry having an input coupled to the output of the slicer circuitry and having an output, the MSE calculator circuitry operable to calculate a MSE value of the symbols.

3. The apparatus of claim 2, wherein the input to the timing loop circuitry is a first input, the timing loop circuitry having a second input coupled to the output of the MSE calculator circuitry, the timing loop circuitry further operable to compare the MSE value of the symbols to a threshold value.

4. The apparatus of claim 3, wherein:
in response to the MSE value of the symbols being greater than the threshold value, determine the frequency of voltage oscillations to be a first frequency used to change the plurality of phase parameters by a first amount; and
in response to the MSE value of the symbols being less than the threshold value, determine the frequency of voltage oscillations to be a second frequency used to change the plurality of phase parameters by a second amount, wherein the second frequency is less than the first frequency and the second amount of change is less than the first amount of change.

5. The apparatus of claim 1, wherein:
the timing loop circuitry is a primary timing loop circuitry;
the phase interpolator circuitry is a first phase interpolator circuitry;
the apparatus further includes secondary timing loop circuitry and second phase interpolator circuitry;
the second phase interpolator circuitry is operable to change one or more phase parameters in a second ADC clock in the plurality of ADC clocks, the phase parameters to change at a rate determined by the secondary timing loop circuitry; and
the primary timing loop circuitry is further operable to share the frequency of voltage oscillations with the secondary timing loop circuitry so that the plurality of phase parameters corresponding to the first ADC clock and the second ADC clock are changed at a same rate.

6. The apparatus of claim 1, wherein the timing error detector circuitry is further operable to, when a symbol transition is not indicated, hold the error value at a previous value.

7. The apparatus of claim 1, wherein:
the error value is a first error value;
the timing error detector circuitry is further operable to calculate the first error value using a Mueller and Müller Timing Error Detector and a second error value using an Early-Late Timing Error Detector; and
the timing loop circuitry is to further operable to determine the frequency of voltage oscillations based on a sum of the first error value and the second error value.

8. The apparatus of claim 1, wherein the analog signal is an Ethernet signal.

9. The apparatus of claim 1, wherein the change to the plurality of phase parameters corrects phase errors in the plurality of ADC clocks.

10. A physical layer (PHY) circuit comprising:
interface circuitry operable to be coupled to a transmission medium;
transmitter circuitry coupled to the interface circuitry and operable to transmit a first analog signal,
slicer circuitry having an input coupled to the interface circuitry and having an output, the slicer circuitry configured to receive a second analog signal corresponding to a first of a plurality of Analog to Digital Converter (ADC) clocks, the slicer circuitry operable to determine symbols based on the second analog signal;
logic circuitry having an input coupled to the output of the slicer circuitry and having an output, the logic circuitry operable to indicate a symbol transition in the symbols;
timing error detector circuitry having an input coupled to the output of the logic circuitry and having an output, the timing error detector circuitry operable to, in response to an indication of a symbol transition, update an error value;
timing loop circuitry having an input coupled to the output of the timing error detector circuitry and having an output, the timing loop circuitry operable to determine a frequency of voltage oscillations based on the error value; and
phase interpolator circuitry having an input coupled to the output of the timing loop circuitry and having an output, the phase interpolator circuitry operable to change a plurality of phase parameters of the plurality of ADC clocks based on the frequency of voltage oscillations.

11. The PHY circuit of claim 10, further including Mean Square Error (MSE) calculator circuitry having an input coupled to the output of the slicer circuitry and having an output, the MSE calculator circuitry operable to calculate a MSE value of the symbols.

12. The PHY circuit of claim 11, wherein the input to the timing loop circuitry is a first input, the timing loop circuitry having a second input coupled to the output of the MSE calculator circuitry, the timing loop circuitry further operable to compare the MSE value of the symbols to a threshold value.

13. The PHY circuit of claim 12, wherein:
in response to the MSE value of the symbols being greater than the threshold value, determine the frequency of voltage oscillations to be a first frequency used to change the plurality of phase parameters by a first amount; and
in response the MSE value of the symbols being less than the threshold value, determine the frequency of voltage oscillations to be a second frequency used to change the plurality of phase parameters by a second amount, wherein the second frequency is less than the first frequency and the second amount of change is less than the first amount of change.

14. The PHY circuit of claim 10, wherein:
the timing loop circuitry is a primary timing loop circuitry;
the phase interpolator circuitry is a first phase interpolator circuitry;
the PHY circuit further includes secondary timing loop circuitry and second phase interpolator circuitry;
the second phase interpolator circuitry is operable to change one or more phase parameters in a second ADC clock in the plurality of ADC clocks, the phase parameters to change at a rate determined by the secondary timing loop circuitry; and the primary timing loop circuitry is further operable to share the frequency of voltage oscillations with the secondary timing loop circuitry so that the plurality of phase parameters corresponding to the first ADC clock and the second ADC clock are changed at a same rate.

15. The PHY circuit of claim 10, wherein the timing error detector circuitry is further operable to, when a symbol transition is not indicated, hold the error value at a previous value.

16. The PHY circuit of claim 10, wherein:
the error value is a first error value;
the timing error detector circuitry is further operable to calculate the first error value using a Mueller and Müller Timing Error Detector and a second error value using an Early-Late Timing Error Detector; and
the timing loop circuitry is to further operable to determine the frequency of voltage oscillations based on a sum of the first error value and the second error value.

17. The PHY circuit of claim 10, wherein the first analog signal and second analog signal are Ethernet signals.

18. The PHY circuit of claim 10, wherein the change to the plurality of phase parameters corrects phase errors in the plurality of ADC clocks.

19. A communication device comprising:
physical layer (PHY) circuitry including:
interface circuitry operable to be coupled to a transmission medium;
slicer circuitry having an input coupled to the interface circuitry and having an output, the slicer circuitry configured to receive an analog signal corresponding to a first of a plurality of Analog to Digital Converter (ADC) clocks and the slicer circuitry operable to determine symbols based on the analog signal;
logic circuitry having an input coupled to the output of the slicer circuitry and having an output, the logic circuitry operable to indicate a symbol transition in the symbols;
timing error detector circuitry having an input coupled to the output of the logic circuitry and having an output, the timing error detector circuitry operable to, in response to an indication of a symbol transition, update an error value;
timing loop circuitry having an input coupled to the output of the timing error detector circuitry and having an output, the timing loop circuitry operable to determine a frequency of voltage oscillations based on the error value; and
phase interpolator circuitry having an input coupled to the output of the timing loop circuitry and having an output, the phase interpolator circuitry operable to change a plurality of phase parameters corresponding to the plurality of ADC clocks based on the frequency of voltage oscillations; and
a processor coupled to the PHY circuitry and operable to:
access the symbols; and
perform an action based on the symbols.

20. The communication device of claim 19, wherein:
the timing loop circuitry is a primary timing loop circuitry;
the phase interpolator circuitry is a first phase interpolator circuitry;
the communication device further includes secondary timing loop circuitry and second phase interpolator circuitry;
the second phase interpolator circuitry is operable to change one or more phase parameters in a second ADC clock in the plurality of ADC clocks, the phase parameters to change at a rate determined by the secondary timing loop circuitry; and
the primary timing loop circuitry is further operable to share the frequency of voltage oscillations with the secondary timing loop circuitry so that the plurality of phase parameters corresponding to the first ADC clock and the second ADC clock are changed at a same rate.

* * * * *